US009167669B2

(12) United States Patent
Karc et al.

(10) Patent No.: US 9,167,669 B2
(45) Date of Patent: Oct. 20, 2015

(54) STATE CHANGE DEVICES FOR SWITCHED ELECTRICAL RECEPTACLES

(71) Applicant: Lutron Electronics Co., Inc., Coopersburg, PA (US)

(72) Inventors: Jeffrey Karc, Danielsville, PA (US); Ankit Bhutani, Bethlehem, PA (US); Galen Edgar Knode, Macungie, PA (US); Jamie Steffie, Slatington, PA (US)

(73) Assignee: LUTRON ELECTRONIC CO., INC., Coopersburg, PA (US)

( * ) Notice: Subject to any disclaimer, the term of this patent is extended or adjusted under 35 U.S.C. 154(b) by 304 days.

(21) Appl. No.: 13/830,102

(22) Filed: Mar. 14, 2013

(65) Prior Publication Data
US 2014/0265881 A1 Sep. 18, 2014

(51) Int. Cl.
*H05B 37/02* (2006.01)
*H05B 39/04* (2006.01)
*H05B 41/36* (2006.01)
*H02J 13/00* (2006.01)

(52) U.S. Cl.
CPC ............ *H05B 37/0272* (2013.01); *H02J 13/00* (2013.01); *Y02B 70/3283* (2013.01); *Y02B 90/2653* (2013.01); *Y04S 20/246* (2013.01); *Y04S 40/126* (2013.01); *Y10T 307/858* (2015.04)

(58) Field of Classification Search
USPC .................................. 315/149, 158, 291, 151
See application file for complete search history.

(56) References Cited

U.S. PATENT DOCUMENTS

| 4,563,592 | A | 1/1986 | Yuhasz et al. |
| 4,889,999 | A | 12/1989 | Rowen |
| 5,239,205 | A | 8/1993 | Hoffman et al. |
| 5,340,954 | A | 8/1994 | Hoffman et al. |
| 5,818,128 | A | 10/1998 | Hoffman et al. |
| 5,905,442 | A | 5/1999 | Mosebrook et al. |
| RE38,069 | E | 4/2003 | Posa |
| 6,803,728 | B2 | 10/2004 | Balasubramaniam et al. |
| 7,198,523 | B2 | 4/2007 | Adams et al. |
| 7,311,558 | B2 | 12/2007 | Adams et al. |
| 7,687,940 | B2 | 3/2010 | Mosebrook et al. |
| 7,772,724 | B2 | 8/2010 | Mosebrook et al. |
| 7,847,440 | B2 | 12/2010 | Mosebrook et al. |

(Continued)

OTHER PUBLICATIONS

"Platinum Technology Accessories," www.hunterdouglas.com/pdf/PlatinumAccessories.pdf, © 2011, accessed Mar. 14, 2013, 3 pages.

(Continued)

*Primary Examiner* — Adam Houston
(74) *Attorney, Agent, or Firm* — Condo Roccia Koptiw LLP

(57) ABSTRACT

A state change device may be electrically connected to a switched receptacle, or to both the switched and unswitched receptacles, of an outlet. The state change device may generate a change of state signal when power is applied to, or removed from, the switched receptacle. The state change device may wirelessly communicate the signal. The state change device may include a load control circuit that may be configured to control the amount of power delivered to an electrical load that is electrically connected to the state change device. The state change device may receive commands directed to the load control circuit. The state change device may be deployed in a load control system and may operate as a control entity, such that the state change device may issue commands to one or more load control devices, responsive to the application or removal of power at the switched receptacle.

30 Claims, 11 Drawing Sheets

(56) References Cited

U.S. PATENT DOCUMENTS

| | | | |
|---|---|---|---|
| 7,872,423 B2 | 1/2011 | Biery et al. | |
| 8,212,424 B2 | 7/2012 | Mosebrook et al. | |
| 8,212,425 B2 | 7/2012 | Mosebrook et al. | |
| 2010/0076615 A1* | 3/2010 | Daniel et al. | 700/293 |
| 2011/0031806 A1 | 2/2011 | Altonen et al. | |
| 2012/0049800 A1* | 3/2012 | Johnson et al. | 320/111 |
| 2012/0286676 A1 | 11/2012 | Saveri, III et al. | |
| 2014/0142724 A1* | 5/2014 | Park et al. | 700/17 |
| 2014/0265577 A1* | 9/2014 | Beckman | 307/39 |
| 2014/0353135 A1* | 12/2014 | Erdmann et al. | 200/518 |
| 2015/0005900 A1* | 1/2015 | Steele et al. | 700/19 |

OTHER PUBLICATIONS

"Introduction to the Platinum™ RF Adapter," www.automatedshadeinc.com/files/controls-hunterdouglas/rf_adapter_instructions_5110540111_0511.pdf, © 2011, accessed Mar. 14, 2013, 2 pages.

\* cited by examiner

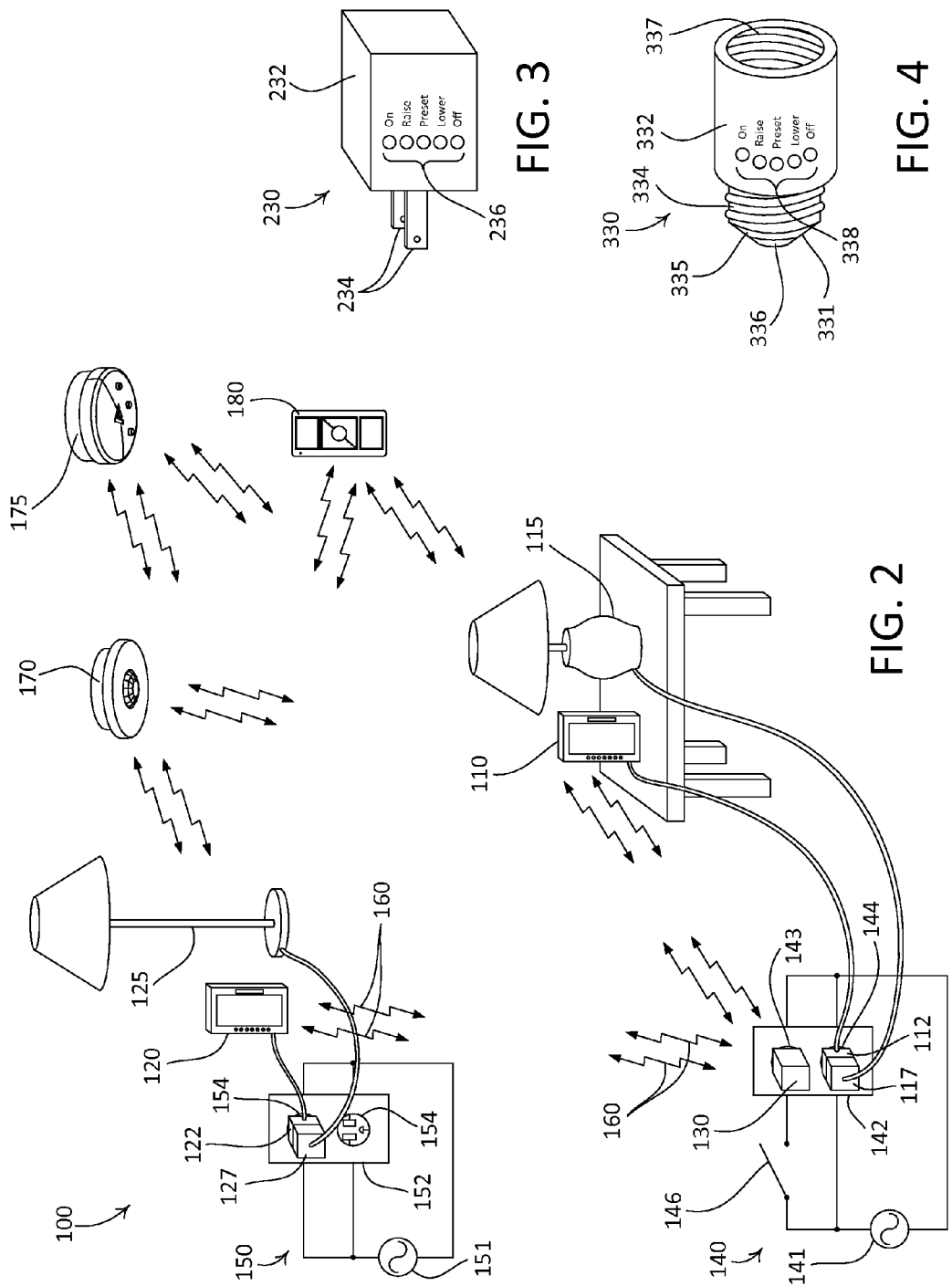

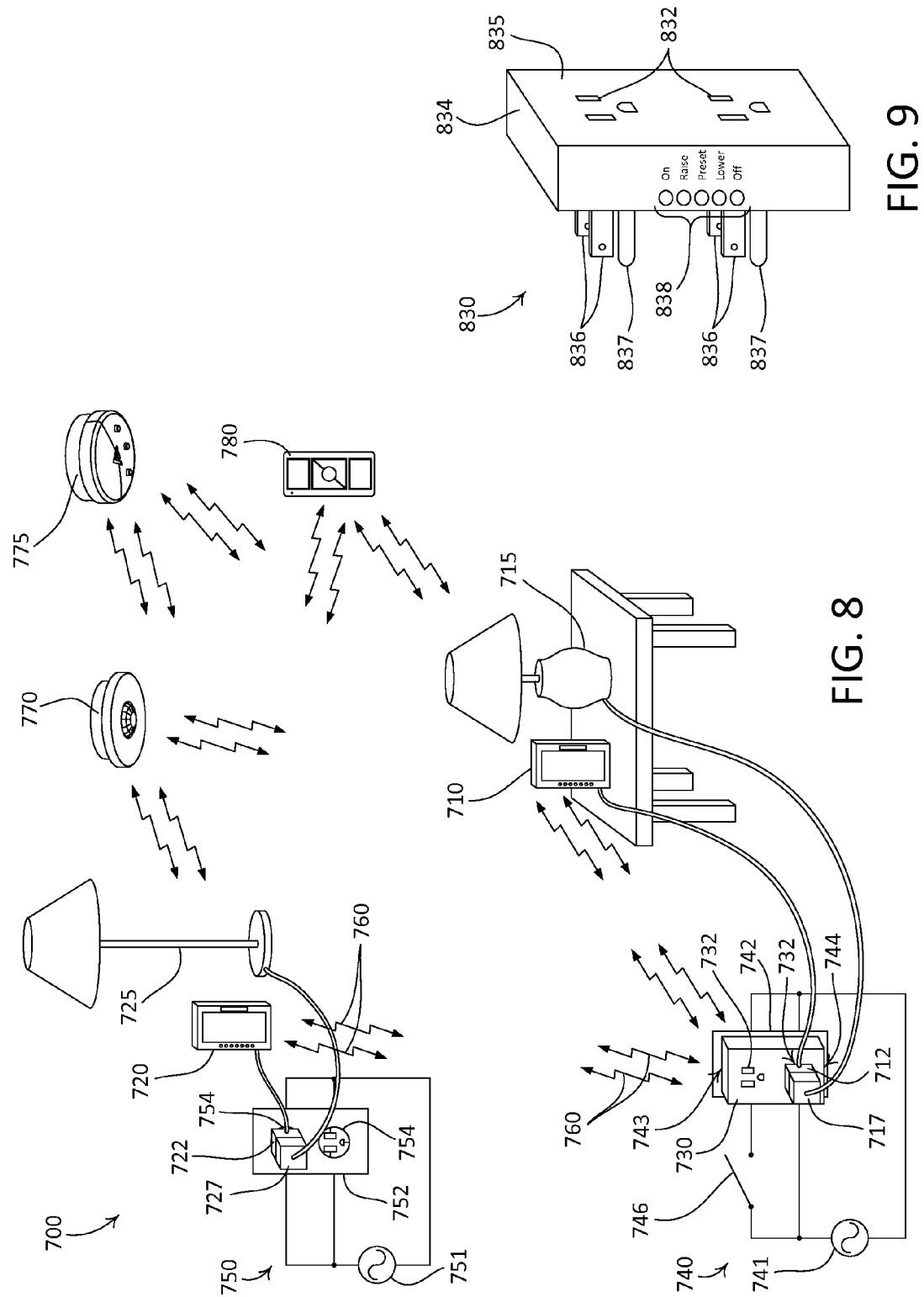

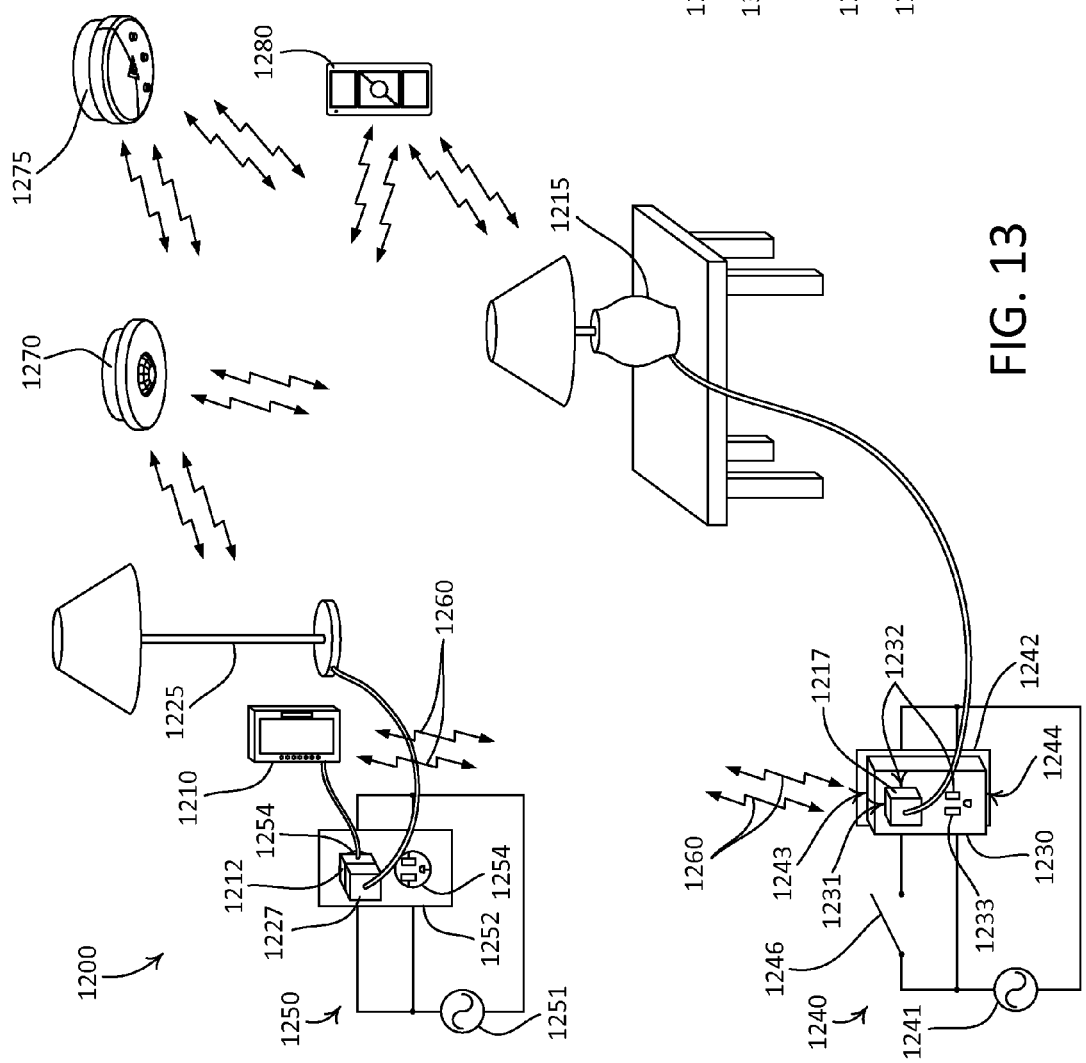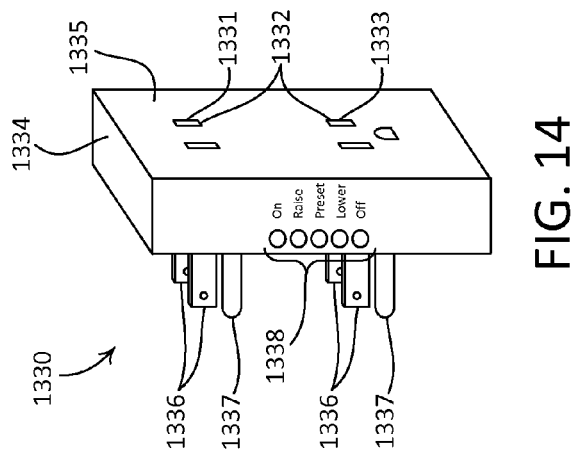

STATE CHANGE DEVICES FOR SWITCHED ELECTRICAL RECEPTACLES

BACKGROUND

Electrical loads, such as lamps, ceiling lighting fixtures, thermostats, shades, etc., may be controlled using load control devices. Such load control devices may be configured for wireless communication. For example, a lamp may be electrically connected, for example plugged in, to such a load control device. The load control device may be, for example, a dimmer switch configured for radio-frequency wireless communication (e.g., an RF dimmer switch).

FIG. 1 depicts an example prior art lighting control system 10 that includes a table top RF dimmer switch 20 and a lamp 30 plugged into the dimmer switch 20, such that the dimmer switch 20 controls the amount of power delivered to the lamp 30. The dimmer switch 20 is electrically connected to an electrical circuit 40 that includes an alternating current (AC) power source 41 and an AC outlet 42 electrically connected to the source 41. The outlet 42 includes a switched receptacle 43 and an unswitched receptacle 44. The electrical circuit 40 also includes a wall-mounted switch 46 that is coupled in series electrical connection between the source 41 and the switched receptacle 43.

The lamp 30 is also controlled by the wall-mounted switch 46. The dimmer switch 20 includes a plug 22 that is plugged into the switched receptacle 43 and the lamp 30 includes a plug 32 that is plugged into the plug 22 of the dimmer switch 20, such that the delivery of power to the lamp 30 may be controlled via the wall-mounted switch 46.

The lighting control system 10 also includes a plurality of devices configured to wirelessly communicate with the dimmer switch 20. As shown, the lighting control system 10 includes an occupancy and/or vacancy sensor 50, a daylight sensor 60, and a remote control 70, such as a remote keypad. The occupancy and/or vacancy sensor 50, daylight sensor 60, and/or remote control 70 may wirelessly communicate with the dimmer switch 20, for example to command the dimmer switch 20, using RF signals 90.

Though a user could plug the dimmer switch 20 into the unswitched receptacle 44, many users may prefer to combine the functionality of the dimmer switch 20 with the ability to switch power to the lamp 30 using the wall-mounted switch 46.

However, control of the illustrated lighting control system 10 may be compromised when power is removed from the switched receptacle 43. For example, when the wall-mounted switch 46 is flipped to the off position, the dimmer switch 20 may become unresponsive to wirelessly communicated commands, for example commands to turn on, turn off, or dim the lamp 30, from the occupancy and/or vacancy sensor 50, the daylight sensor 60, and the remote control 70. When the wall switch 46 is turned off, a wireless communication component of the dimmer switch 20, such as a receiver, may be unpowered and thus unable to receive the wirelessly communicated commands.

SUMMARY

As disclosed herein, a state change device may be configured to be electrically connected to a switched AC receptacle of an outlet. The state change device may also be configured to be electrically connected to both the switched and unswitched AC receptacles of an outlet. The state change device may be configured to generate a signal indicative of a change of state when power is applied to, or removed from, the switched receptacle. The state change device may wirelessly communicate the signal, for example to one or more electrical devices associated with the state change device, for example a load control device such as a table-top dimmer switch configured for wireless communication.

The state change device may be installed and configured to operate with an existing load control system, for example an existing lighting control system, without requiring electrical re-wiring. The state change device may allow a user of the state change device to relocate an electrical load, such as a lighting load, that was previously plugged into the switched receptacle of the outlet, to the receptacle of another outlet that is remote from the switched receptacle, for example an outlet in another location within a room. The state change device may allow operation of the relocated lighting load from the switched outlet. The state change device may be configured to control multiple electrical devices in the existing load control system, such as multiple load control devices (e.g., multiple table top dimmer switches). The state change device may be configured to operate with one more control devices associated with the existing load control system, such as one or more of an occupancy and/or vacancy sensor, a daylight sensor, or a remote control, without requiring that a new device be wired in place of the light switch.

The state change device may include a sensing circuit configured to detect when AC power is applied to and/or removed from the switched receptacle, a controller, and a communications circuit configured for wireless communication. The sensing circuit may be configured to inform the controller when power is applied to and/or removed from the switched receptacle. The controller may be configured to generate the signal, upon being informed of the application of power to, and/or the removal of power from, the switched receptacle, and to cause the signal to be transmitted by the communication circuit. The controller may be configured to wait for a predetermined amount of time before causing the signal to be transmitted.

The state change device may include a power supply configured to provide power to the sensing circuit, the controller, and the communications circuit. The power supply may include, for example, a capacitor. The power supply may be electrically connected to the unswitched receptacle.

The state change device may include a load control circuit that may be configured to control the amount of power delivered to an electrical load that is electrically connected to the state change device. The state change device may be configured to receive commands directed to the load control circuit.

BRIEF DESCRIPTION OF THE DRAWINGS

FIG. 2 depicts an example lighting control system.
FIG. 3 depicts an example state change device.
FIG. 4 depicts another example state change device.
FIG. 8 depicts another example lighting control system.
FIG. 9 depicts another example state change device.

FIG. 13 depicts an example lighting control system.

FIG. 14 depicts an example state change device.

DETAILED DESCRIPTION

Figure 1:
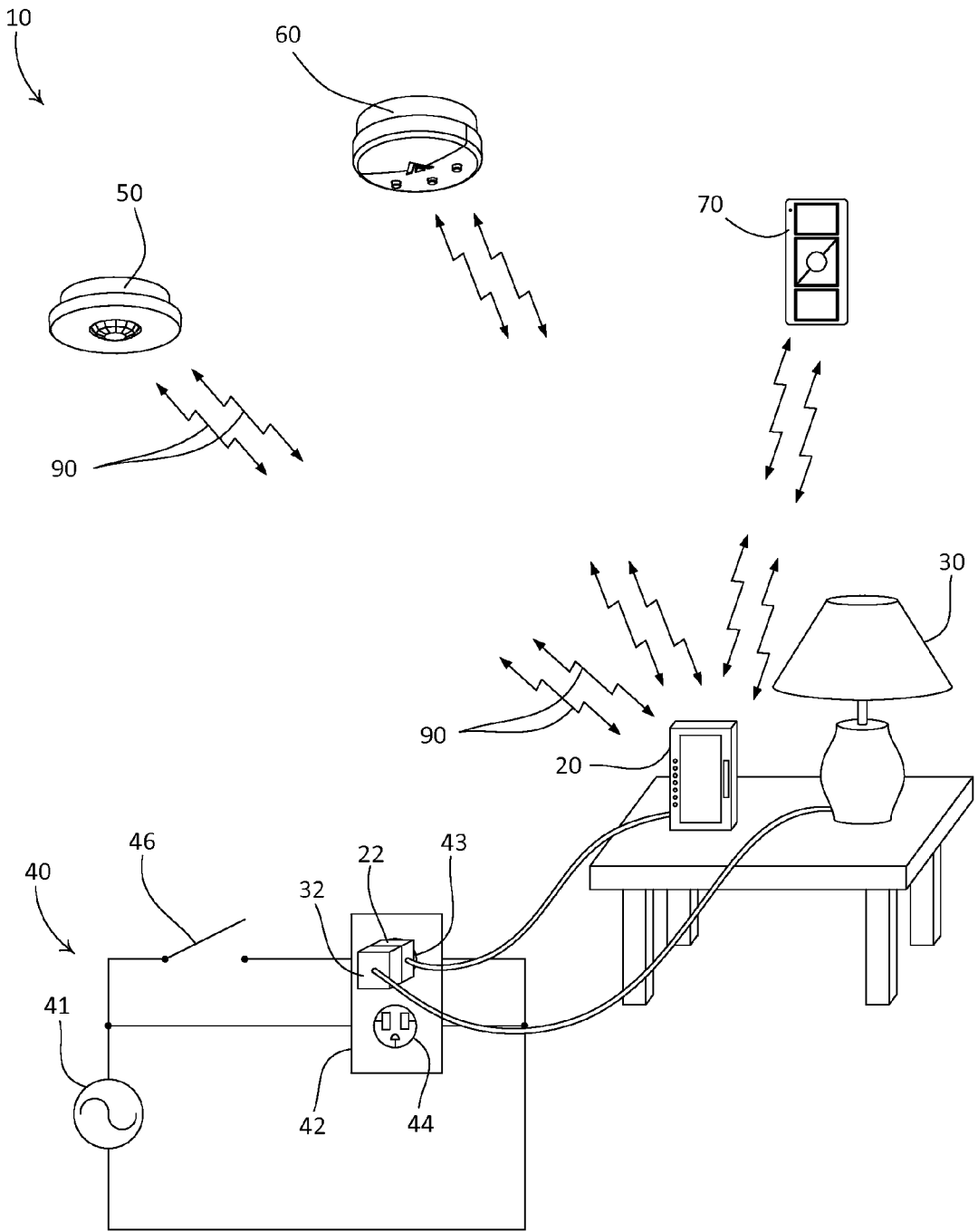
FIG. 1 depicts an example prior art lighting control system.

FIG. 2 depicts an example load control system. As shown, the load control system is a lighting control system 100. The lighting control system 100 includes a first load control device 110, a second load control device 120, and a device that may be referred to as a state change device 130 or a state change controller. The state change device 130 is configured to send signals to one or both of the first and second load control devices 110, 120 via wireless communication. The state change device 130 is plugged into a switched receptacle 143 of an electrical outlet 142 and the first load control device 110 is plugged into an unswitched receptacle 144 of the outlet 142. The state change device 130 will be powered when a wall-mounted switch 146 that controls the switched receptacle 143 is in the on position. The first load control device 110 will be continuously powered by the unswitched receptacle 144.

As shown, the first and second load control devices 110, 120 are table top RF dimmer switches. The lighting control system 100 further includes a first lamp 115 electrically connected to, for example plugged into, the first load control device 110, such that the first load control device 110 controls the amount of power delivered to the first lamp 115. The lighting control system 100 further includes a second lamp 125 electrically connected to, for example plugged into, the second load control device 120, such that the second load control device 120 controls the amount of power delivered to the second lamp 125.

The state change device 130 may be configured to transmit the signals, for example, via radio-frequency (RF) communication signals 160. The signals may be indicative of a change of state within the lighting control system 100, for example indicative of a change of state at a switched receptacle that the state change device 130 is electrically connected to. Such signals may be referred to as change of state signals, and may be interpreted by one or more devices associated with the state change device 130, for example the first and/or second load control devices 110, 120, as indications to turn on, turn off, dim, etc. respective electrical loads electrically connected to the first and/or second load control devices 110, 120.

The state change device 130 and the first load control device 110 are electrically connected to an electrical circuit 140 that includes an alternating current (AC) power source 141 and an electrical outlet 142 electrically connected to the AC power source 141. The outlet 142 includes a switched receptacle 143 and an unswitched receptacle 144. The state change device 130 is electrically connected to, for example plugged into, the switched receptacle 143 and the first load control device 110 is electrically connected to, for example plugged into, the unswitched receptacle 144. The electrical circuit 140 also includes a wall-mounted switch 146 that is coupled in series electrical connection between the AC power source 141 and the switched receptacle 143.

Delivery of power to the state change device 130 may be controlled via the wall-mounted switch 146. The first load control device 110 includes a plug 112 that is plugged into the unswitched receptacle 144 of the electrical circuit 140 and the first lamp 115 includes a plug 117 that is plugged into the plug 112 of the first load control device 110.

The state change device 130 may transmit signals responsive to delivery or removal of power to the switched receptacle 143 of the outlet 142. When the wall-mounted switch 146 is operated from the off position to the on position, power may be delivered to the switched receptacle 143. The state change device 130 may sense the presence of power at the switched receptacle 143, and may transmit one or more signals, for example via RF signals 160, to one or both of the first and second load control devices 110, 120. The signals may be indicative of a change of state in the lighting control system 100. The one or more signals may be received at one or both of the first and second load control devices 110, 120. Responsive to receipt of the signals, one or both of the first and second load control devices 110, 120 may change the state of the first or second lamps 115, 125, respectively. For example, the first load control device 110 may change the state of the first lamp 115 from off to on and the second load control device 120 may change the state of the second lamp 125 from off to on.

When the wall-mounted switch 146 is operated from the on position to the off position, power may be removed from the switched receptacle 143. The state change device 130 may sense the removal of power from the switched receptacle 143, and may transmit one or more signals, for example via RF signals 160, to one or both of the first and second load control devices 110, 120. The signals may be indicative of a change of state in the lighting control system 100. The one or more signals may be received at one or both of the first and second load control devices 110, 120. Responsive to receipt of the signals, one or both of the first and second load control devices 110, 120 may change the state of the first or second lamps 115, 125, respectively. For example, the first load control device 110 may change the state of the first lamp 115 from on to off and the second load control device 120 may change the state of the second lamp 125 from on to off.

The one or more signals transmitted by the state change device 130, for example responsive to operation of the wall-mounted switch 146 from the on position to the off position or from the off position to the on position, are not limited to indicating a change of state in the lighting control system 100. For example, one or more signals transmitted by the state change device 130, for example responsive to operation of the wall-mounted switch 146, may be indicative of a load control scene (e.g., a lighting scene or preset) to be applied to one or more electrical loads (e.g., the first and second lamps 115, 125) of the lighting control system 100. A lighting scene may include respective predetermined states that are to be assumed by one or more lighting loads of the lighting control system 100. For example, a lighting scene may include one or both of the first and second lamps 115, 125 in the off state, may include one or both of the first and second lamps 115, 125 in the on state, may include one or both of the first and second lamps 115, 125 dimmed to a select dimming level, or any combination of thereof.

Respective signals indicative of one or more load control scenes may be transmitted, for example, in accordance with a number of times that the wall-mounted switch 146 is operated from one state to the other (e.g., from off to on or from on to off) within a prescribed amount of time. For example, the state change device 130 may be configured to generate and transmit one or more change of state signals if the wall-mounted switch 146 is operated from one state to the other once during the prescribed amount of time, may be configured to generate and transmit one or more signals indicative of a first lighting scene if the wall-mounted switch 146 is operated from one state to the other twice during the prescribed amount of time, may be configured to generate and transmit one or more signals indicative of a second lighting scene if the wall-mounted switch 146 is operated from one state to the other three times during the prescribed amount of time, and so on.

The state change device 130 may be deployed in a load control system that includes multiple load control devices and/or associated electrical loads, such as the lighting control system 100 depicted in FIG. 2. One of the load control devices, for example the first load control device 110 or the second load control device 120, may be configured to operate as a control entity, such as a master device, within the lighting control system 100.

The master device, or master, may operate to at least partially control functionality of the other load control devices of the load control system. The other load control devices of the load control system may be configured to assume subservient roles to the master device, such that the subservient devices will perform commands issued by the master. It should be appreciated that if the load control system includes only one load control device, the load control system may not include a master.

One of the load control devices may be designated as the master, for example by a user of the load control system. Alternatively, one of the load control devices may assume the role of the master. For example, upon association with the load control system, a load control device may poll the other load control devices of the load control system, for example via broadcast, to determine if the load control system currently has a master. If the polling load control device does not receive an answer that another device of the load control system is the master, the polling load control device may assume the role of the master in the load control system.

The master load control device may be configured to observe and/or record present state information pertaining to one or more subservient load control devices of the load control system. In an example, with reference to the lighting control system 100 shown in FIG. 2, the first load control device 110 may assume the role of master and the second load control device 120 may assume a subservient role to the first load control device 110, such that the first load control device 110 is able to at least partially control operation of the second load control device 120. The first load control device 110 may observe and/or record present state information, for example last known state information, pertaining to the second load control device 120 and/or to an electrical load electrically connected to the second load control device 120, for example information pertaining to a last known state of the second lamp 125 (e.g., whether the second lamp 125 is on or off).

The first load control device 110, in the role of master in the lighting control system 100, may be configured such that if at least one lighting load, for example the first lamp 115 or the second lamp 125, is in an on state when the state change device 130 transmits one or more change of state signals, one or more of the other lighting loads of the lighting control system 100 (e.g., each of the other lighting loads) will be operated from the on state to the off state or left in the off state. For example, if the first lamp 115 is off and the second lamp 125 is on when the wall-mounted switch 146 is operated, the state change device 130 will transmit one or more change of state signals that may be received by the first and second load control devices 110, 120. The second load control device 120 may ignore the one or more change of state signals from the state change device 130, for example in accordance with the subservient role the second load control device 120 has with respect to the first load control device 110. When the one or more change of state signals are received by the first load control device 110, the first load control device 110 will not change the state of the first lamp 115 and may forward the one or more change of state signals to the second load control device 120. Alternatively, the first load control device 110 may reference the last known state information pertaining to the second load control device 120, and may transmit an appropriate command, for example a command to turn the second lamp 125 off, to the second load control device 120. The second load control device 120, upon receipt of the forwarded change of state signal or the command, will change the state of the second lamp 125 from on to off.

Alternatively, first load control device 110, in the role of master in the lighting control system 100, may be configured to maintain synchronization of the lighting loads of the lighting control system 100. For example, if the state of the first lamp 115 is changed locally at the first load control device 110, the first load control device 110 may transmit a command to the second load control device 120 that will cause second load control device 120 to change the state of the second lamp 125, thus keeping the states of the first and second lamps 115, 125, synced to one another. If the state of the second lamp 125 is changed locally at the second load control device 120, the first load control device 110 may change the state of the first lamp 115, thus keeping the states of the first and second lamps 115, 125, synced to one another.

When the wall-mounted switch 146 is operated, the state change device 130 will transmit one or more change of state signals that may be received by the first and second load control devices 110, 120. The second load control device 120 may ignore the one or more change of state signals from the state change device 130, for example in accordance with the subservient role the second load control device 120 has with respect to the first load control device 110. When the one or more change of state signals are received by the first load control device 110, the first load control device 110 will change the state of the first lamp 115, for example from on to off or from off to on, and may forward the one or more change of state signals to the second load control device 120. Alternatively, the first load control device 110 may transmit an appropriate command, for example to turn the second lamp 125 on or off, to the second load control device 120. The second load control device 120, upon receipt of the forwarded change of state signal or the command, will change the state of the second lamp 125, for example from on to off or from off to on, such that the states of the first and second lamps 115, 125 are kept in sync.

The role of master in a load control system in which the state change device 130 is deployed, for example the lighting control system 100, need not be fulfilled by a load control device of the load control system, for example the first or second load control devices 110, 120. Such a load control system may include another device configured to fulfill the role of master, for example a central controller, a main repeater, or the like. In such a configuration, one or more load control devices of the load control system, for example the first and second load control devices 110, 120, may be configured to assume subservient roles to the master, and the master may be configured to observe and/or record present state information pertaining to the subservient load control devices of the load control system. The subservient load control devices may be configured to ignore change of state signals transmitted by the state change device 130 and the master may be configured to forward change of state signals received from the state change device 130 to the subservient load control devices, or may, upon receipt of one or more change of state signals from the state change device 130, transmit appropriate commands to the subservient load control devices.

A load control system in which the state change device 130 is deployed (e.g., the lighting control system 100) need not include a central control entity, such as a master. One or more load control devices associated with the load control system (e.g., for example the first and second load control devices 110, 120) may be configured to be aware of present state information pertaining to the other load control devices of the lighting control system 100. For example, the first load control device 110 may be configured to be aware of whether the second lamp 125 electrically connected to the second load control device 120 is on or off. Similarly, the second load control device 120 may be configured to be aware of whether the first lamp 115 electrically connected to the first load control device 110 is on or off. In such a configuration, the first and second load control devices 110, 120 may operate to ensure that the first and second lamps 115, 125 are kept in sync with one another, for example responsive to one or more change of state signals transmitted by the state change device 130.

The second load control device 120 is electrically connected to an electrical circuit 150 that includes an alternating current (AC) power source 151 and an electrical outlet 152 electrically connected to the AC power source 151. The AC power source 151 may be, for example, the AC power source 141. The outlet 152 includes two unswitched receptacles 154. The second load control device 120 includes a plug 122 that is plugged into one of the unswitched receptacles 154 of the outlet 152 and the second lamp 125 includes a plug 127 that is plugged into the plug 122 of the second load control device 120. The lighting control system 100 need not include the illustrated second load control device 120 and/or the second lamp 125. Furthermore, lighting control system 100 may include more or fewer load control devices that are associated with, for example configured to be controlled by, the state change device 130. Each of the more or fewer load control devices may be electrically connected to respective electrical devices.

The lighting control system 100 may also include one or more other devices configured to wirelessly communicate with one or both of the first and second load control devices 110, 120. As shown, the lighting control system 100 includes an occupancy and/or vacancy sensor 170, a daylight sensor 175, and a remote control 180, such as a remote keypad. The occupancy and/or vacancy sensor 170, the daylight sensor 175, and/or the remote control 180 may wirelessly communicate with one or both of the first and second load control devices 110, 120, for example using RF signals 160. For example, the occupancy and/or vacancy sensor 170, the daylight sensor 175, and/or the remote control 180 may wirelessly communicate commands to one or both of the first and second load control devices 110, 120 (e.g., turn on, turn off, or dim one or both of the first lamp 115 or the second lamp 125).

FIG. 3 depicts an example state change device 230. The state change device 230 may be deployed, for example, as the state change device 130 as depicted in FIG. 2. The state change device 230 includes a housing 232 that may be made of any suitable material, such as plastic. The housing 232 may enclose one or more electrical components of the state change device 230. The state change device 230 may be configured to be placed into electrical communication with an electrical circuit, for example the electrical circuit 140. As shown, the state change device 230 includes a plug that includes a pair of blades 234 that protrude inward from the housing 232 and are configured to be inserted into a receptacle of a standard electrical outlet, for example the switched receptacle 143 of the outlet 142. The state change device 230 may define a control interface that is accessible to a user of the state change device 230. For example, the illustrated state change device 230 includes a plurality of buttons 236 that protrude through a side of the housing 232. Each of the buttons 236 may be associated with one or more functions of the state change device 230.

FIG. 4 depicts another example state change device 330 that may be used for example, in the lighting control system 100. For example, the state change device 330 may be electrically connected to, for example screwed into, a socket of the first lamp 115 or the second lamp 125. The state change device 330 includes a housing 332 that may be made of any suitable material, such as plastic. The housing 332 may enclose one or more electrical components of the state change device 330. The state change device 330 may be configured to be placed into electrical communication with an electrical circuit. As shown, the state change device 330 includes a terminal assembly 331 that protrudes forward through the housing 332 and is configured to be screwed into a standard light socket. The terminal assembly 331 includes a side terminal 334, a base terminal 336 and an insulator 335 electrically isolates the side terminal 334 from the base terminal 336. The state change device 330 defines a socket 337 that extends into an end of the housing 332 opposite the terminal assembly 331. The socket 337 may be configured to receive a standard light bulb, for example. The state change device 330 may define a user interface that is accessible to a user of the state change device 330. For example, the illustrated state change device 330 includes a plurality of buttons 338 that protrude through a side of the housing 332. Each of the buttons 338 may be associated with one or more functions of the state change device 330.

Figure 5:
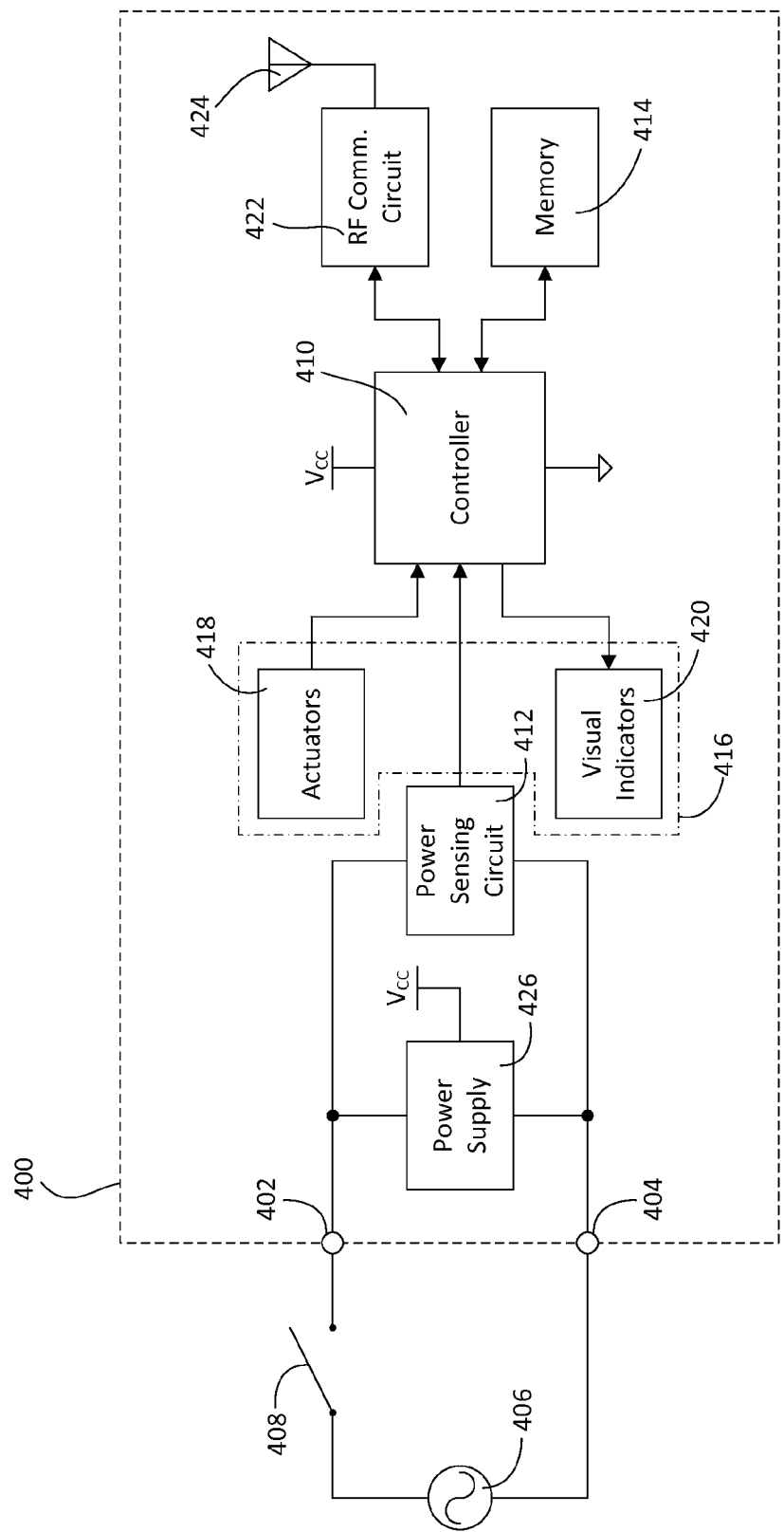
FIG. 5 is a simplified block diagram of an example state change device.

FIG. 5 is a simplified block diagram of an example state change device 400 that may be implemented as, for example, the state change device 130 illustrated in FIG. 2, the state change device 230 illustrated in FIG. 3, or the state change device 330 illustrated in FIG. 4. As shown, the state change device 400 includes hot and neutral terminals 402, 404 that are configured to be electrically connected to a receptacle of an outlet powered by an alternating current (AC) power source 406. The receptacle is a switched receptacle that may be controlled by a switch 408, such as a wall-mounted switch.

The state change device 400 includes a control circuit, for example a controller 410, that is configured to control one or more functions of the state change device 400. The controller 410 may include one or more components, such as processors (e.g., microprocessors), microcontrollers, integrated circuits (e.g., field programmable gate arrays), or the like, in any combination. For example, the controller 410 may include a processor (not shown) that may execute computer-executable instructions in order to control one or more functional aspects of the state change device 400.

The state change device 400 includes a power sensing circuit 412 that is configured to sense when power is applied to the state change device 400, for example when the switch 408 is closed such that power is delivered from the AC power source 406 to the state change device 400. The power sensing circuit 412 may provide one or more signals to the controller 410 that are indicative of whether power is applied to (e.g., present at) a switched receptacle to which the state change device 400 is electrically connected, for example the switched receptacle 143 of the outlet 142. For example, the power sensing circuit 412 may provide a signal to the controller 410 when the switch 408 is operated from the open position to the closed position. The signal may be indicative of power being applied at the switched receptacle 143. The power sensing circuit 412 may provide a signal to the controller 410 when the switch 408 is operated from the closed position to the open position. The signal may be indicative of power being removed from the switched receptacle 143 of the outlet 142, for example.

The state change device 400 includes a memory 414. The memory 414 may be communicatively coupled to the controller 410 and may operate to store information such as computer-executable instructions, configuration settings associated with operation of the state change device 400, a last known state of one or more devices associated with the state change device 400, or the like. The memory 414 may include any component suitable for storing the information. For example, the memory 414 may include one or more components of volatile and/or non-volatile memory, in any combination. The memory 414 may be internal and/or external with respect to the controller 410. For example, the memory 414 and the controller 410 may be integrated within a microchip. During operation of the state change device 400, the controller 410 may store and/or retrieve information, for instance the computer-executable instructions, from the memory 414. It should be appreciated that functionality of the controller 410 may include any combination of hardware, firmware, and/or software.

The state change device 400 includes a control interface 416 that may be operated, for example, by a user of the state change device 400. As shown, the control interface 416 includes one or more actuators 418 that may be, for example, the buttons 236 of the state change device 230 or the buttons 338 of the state change device 330, and one or more visual indicators 420, for example light emitting diodes (LEDs). Each actuator 418 may be associated with a respective visual indicator 420, for example. The control interface 416 may provide one or more inputs to the controller 410, for example a signal indicative of actuation of a corresponding one of the actuators 418. The control interface 416 may receive one or more inputs from the controller 410, for example commands to cause one or more of the visual indicators 420 to illuminate.

The state change device 400 includes a wireless communication circuit 422 that is communicatively coupled to the controller 410. The wireless communication circuit 422 may include, for example, an RF communication circuit coupled to an antenna 424. The wireless communication circuit 422 may include one or more components operable for the transmission and/or reception of information that may include signals and/or data. For instance, the wireless communication circuit 422 may include an RF transceiver, an RF transmitter, an RF receiver, an infrared (IR) transmitter, an IR receiver, a modem, and/or the like. The controller 410 may be configured to transmit information via the wireless communication circuit 422, for example a signal indicative of a change of state of the state change device 400, such as the application of power to or the removal of power from a switched receptacle to which the state change device 400 is electrically connected. The wireless communication circuit 422 may be configured with capabilities to transmit information in accordance with one or more communication schemes. For example, the wireless communication circuit 422 may be configured to be capable of transmitting information via RF communication.

The state change device 400 includes a power supply 426 configured to supply power to one or more components of the state change device 400, for instance when the switch 408 is closed such that power is delivered to the switched receptacle 143 of the outlet 142. The power supply 426 may be configured to accumulate and store electricity when a voltage associated with the AC power source 406 is dropped across the state change device 400, for instance when power is delivered to the switched receptacle 143. The power supply 426 may be a transitory power supply, such that power may not be continuously supplied by the power supply 426. The power supply 426 may be, for example, a capacitor that is charged when power is delivered to the switched receptacle 143. The stored electricity may be used to supply power to one or more components of the state change device 400, for example the controller 410, the power sensing circuit 412, and/or the wireless communication circuit 422. The capacitor may be configured to store sufficient electricity for the controller 410 to cause a change of state signal to be transmitted by the wireless communication circuit 422 when the controller 410 receives a signal from the power sensing circuit 412 indicating that power has been removed from the switched receptacle 143. Alternatively, the power supply 426 may be a semi-permanent, removable power supply capable of continuously providing power to components of the state change device 400, for example one or more batteries.

It should be appreciated that one or more of the above-described components of the state change device 400, such as the power sensing circuit 412, the memory 414, and/or the wireless communication circuit 422, may be at least partially integrated with (e.g., completely integrated with) the controller 410, for example within a single microchip, such as an integrated circuit.

Figure 6:
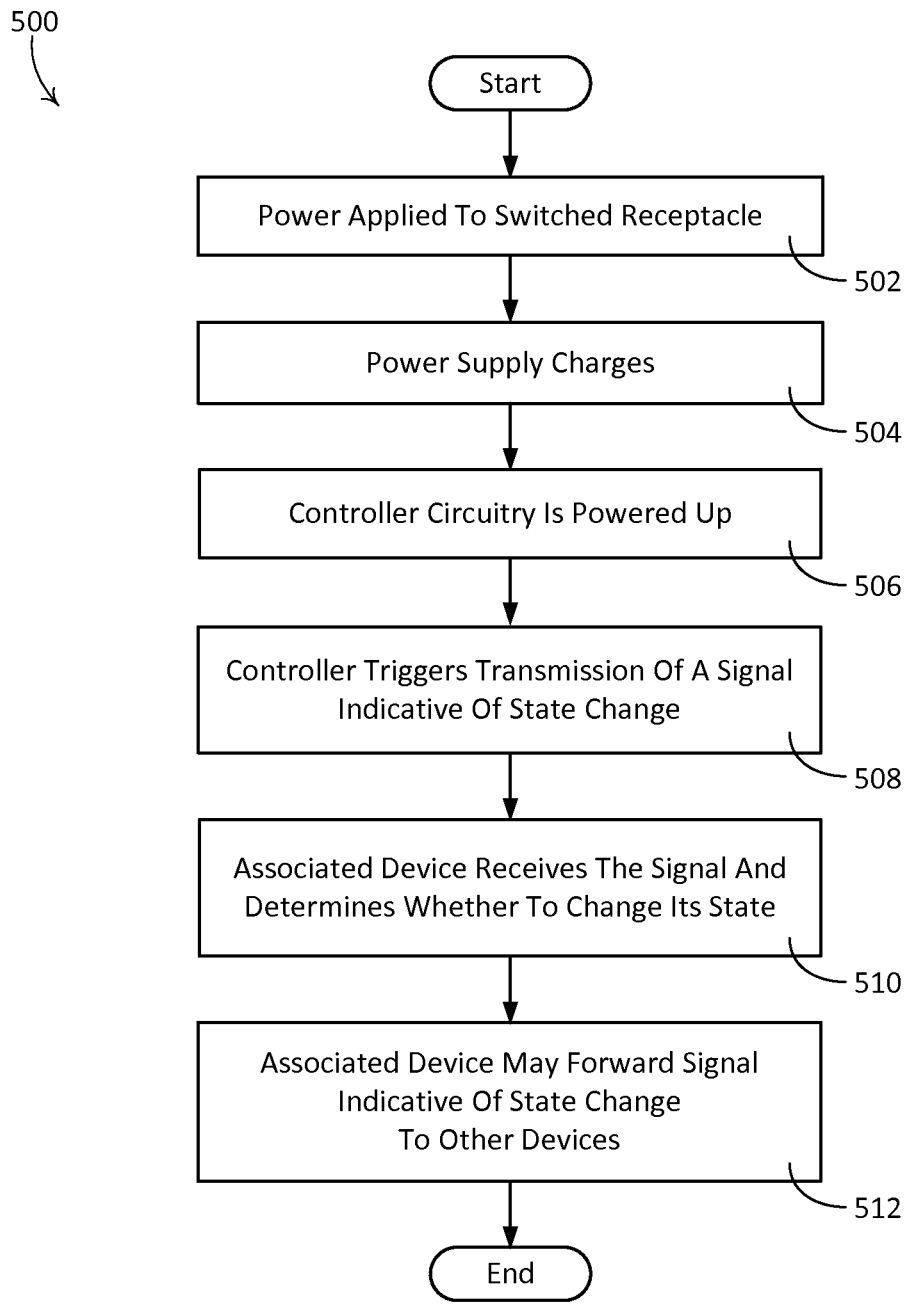
FIG. 6 is a functional diagram illustrating operation of an example state change device when power is applied to a switched AC receptacle.

FIG. 6 is a functional diagram illustrating an example operation process 500 of a state change device, for example the state change devices 130, 230, 330, or 400, when power is applied to a switched AC receptacle to which the state change device is electrically connected, for example the switched receptacle 143 of the outlet 142.

The operation process 500 begins at 502, when power is applied to the switched receptacle to which the state change device, for example the state change device 400, is electrically connected. At 504, the power supply 426 of the state change device 400 charges. At 506, the circuitry of the state change device 400, for example the controller 410, the power sensing circuit 412, and/or the wireless communication circuit 422 are powered up. The circuitry of the state change device 400 may receive power from, for example, the power supply 426. The controller 410 may, for example at 506, initiate a startup routine. The startup routine may be initiated each time the controller circuitry is powered up, for example each time power is applied to the switched receptacle to which the state change device is electrically connected.

At 508, the controller 410 may trigger the wireless communication circuit 422 to transmit a signal indicative of a change of state of the state change device 400. The signal may indicate, for example, that the state of the state change device 400 has changed from an off state to an on state. The controller 410 may cause the signal to be transmitted, for example, as part of the startup routine of the state change device 400. The controller 410 may cause the wireless communication circuit 422 to transmit the signal via the antenna 424. The controller 410 may cause the wireless communication circuit 422 to transmit the signal one or more times, for example in accordance with a configuration setting that is stored in the memory 414 and retrieved by the controller 410.

The one or more signals may be broadcast to one or more devices that are associated with the state change device 400. For example, with reference to the example lighting control system 100 depicted in FIG. 2, the state change device 130 may broadcast the signal to the first and second load control devices 110, 120 via RF signals 160.

Alternatively, subsequent to 506 and prior to 508, for example, the power sensing circuit 412 may determine that power has been supplied to the switched receptacle. The power sensing circuit 412 may detect the presence of power at the switched receptacle. The power sensing circuit 412 may, responsive to detecting power at the switched receptacle, provide a signal to the controller 410 that indicates power has been applied at the switched receptacle. The power sensing circuit 412 may continue to send signals to the controller 410 to indicate the continued presence of power at the switched receptacle. The controller 410 may receive the one or more signals from the power sensing circuit 412 indicating that power has been applied at the switched receptacle. The controller 410 may then wait until a predetermined amount of time has elapsed. The predetermined amount of time may be a state of change threshold time, upon expiration of which the controller 410 may trigger the wireless communication circuit 422 to transmit the signal indicative of a change of state of the state change device 400.

At 510, upon receiving the signal, the first and second load control devices 110, 120 may determine whether to change the states of respective electrical loads electrically connected to the first and second load control devices 110, 120, for example the first and second lamps 115, 125. For example, the first and second load control devices 110, 120 may receive one or more forwarded change of state signals transmitted by the state change device 130, or may receive respective commands, for example transmitted by a master device in the lighting control system 100 responsive to one or more change of state signals transmitted by the state change device 130. The commands may, for example, direct the first and second load control devices 110, 120 to change the states of the first and second lamps 115, 125. Alternatively, the determination may be based, for example, upon a last known state of the first and second lamps 115, 125. Based upon the determinations, the first and second load control devices 110, 120, may initiate state changes for the first and second lamps 115, 125. For example, the first load control device 110 may cause the first lamp 115 to operate from an off state to an on state and the second load control device 120 may cause the second lamp 125 to operate from an off state to an on state.

At 512, the one or more associated devices, for example the first and second load control devices 110, 120, may forward the signal to one or more other devices associated with the first and second load control devices 110, 120. For example, if the first load control device 110 is operating as a master of the lighting control system 100, the first load control device 110 may forward the signal to the second load control device 120 and/or to one or more other devices associated with the lighting control system 100, or may issue a command to the second load control device 120 to change the state of the second lamp 125 (e.g., turn the second lamp 125 on, turn the second lamp 125 off, or dim the second lamp 125). Similarly, if the second load control device 120 is operating as a master of the lighting control system 100, the second load control device 120 may forward the signal to the first load control device 110 and/or to one or more other devices associated with the lighting control system 100, or may issue a command to the first load control device 110 to change the state of the first lamp 115 (e.g., turn the first lamp 115 on, turn the first lamp 115 off, or dim the first lamp 115). After 512, the operation process 500 may conclude. It should be appreciated that 512 is optional, for example in accordance with whether or not one of the first or second load control devices 110, 120 is operating as a master of the lighting control system 100. For example, if neither of the first or second load control devices 110, 120 are operating as a master in the lighting control system 100, the operation process 500 may conclude after 510, when the first and second load control devices 110, 120 have received and/or processed the signal.

Figure 7:
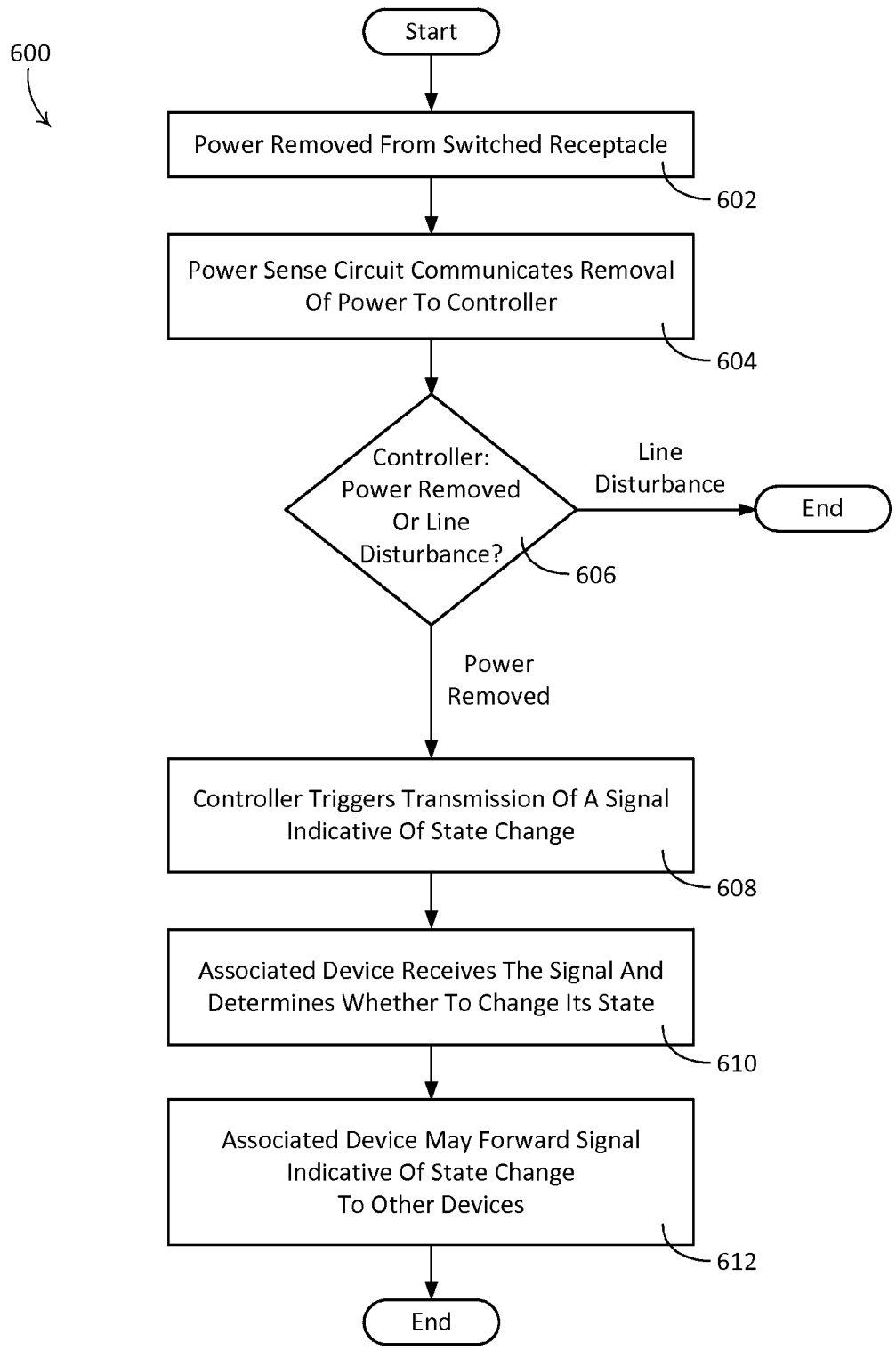
FIG. 7 is a functional diagram illustrating operation of an example state change device ice when power is removed from the switched AC receptacle.

FIG. 7 is a functional diagram illustrating an example operation process 600 of a state change device, for example the state change devices 130, 230, 330, or 400, when power is removed from a switched AC receptacle to which the state change device is electrically connected, for example the switched receptacle 143 of the outlet 142.

The operation process 600 begins at 602, when power is removed from the switched receptacle to which the state change device, for example the state change device 400, is electrically connected. At 604, the power sensing circuit 412 determines that power has been removed from the switched receptacle. The power sensing circuit 412 may detect the absence of power at the switched receptacle. The power sensing circuit 412 may, responsive to detecting the lack of power at the switched receptacle, provide a signal to the controller 410 that indicates power has been removed from the switched receptacle. Alternatively, the power sensing circuit 412 may cease sending signals to the controller 410 that indicate the continued presence of power at the switched receptacle.

At 606, the controller 410 may receive one or more signals from the power sensing circuit 412 indicating that power has been removed from the switched receptacle. The controller 410 may then determine whether power has actually been removed or whether a line disturbance has occurred. The controller 410 may make this determination, for example, by waiting for a predetermined interval of time and listening for one or more signals from the power sensing circuit 412 that indicate that power has been applied at the switched receptacle. If the controller 410 receives one or more such signals, the controller 410 may determine that a line disturbance has occurred and the operation process 600 may conclude. If predetermined interval expires and the controller 410 has not received one or more such signals, the controller 410 may determine that power has been removed from the switched receptacle.

At 608, after determining that power has been removed from the switched receptacle, the controller 410 may trigger the wireless communication circuit 422 to transmit a signal indicative of a change of state of the state change device 400. The signal may indicate, for example, that the state of the state change device 400 has changed from an on state to an off state. The controller 410 may cause the wireless communication circuit 422 to transmit the signal via the antenna 424. The controller 410 may cause the wireless communication circuit 422 to transmit the signal one or more times, for example in accordance with a configuration setting that is stored in the memory 414 and retrieved by the controller 410. The controller 410 and the wireless communication circuit 422 may use electricity stored in the power supply 426 to transmit the one or more signals.

The one or more signals may be broadcast to one or more devices that are associated with the state change device 400. For example, with reference to the example lighting control system 100 depicted in FIG. 2, the state change device 130 may broadcast the signal to the first and second load control devices 110, 120 via RF signals 160.

At 610, upon receiving the signal, the first and second load control devices 110, 120 may determine whether to change the states of respective electrical loads electrically connected to the first and second load control devices 110, 120, for example the first and second lamps 115, 125. For example, the first and second load control devices 110, 120 may receive one or more forwarded change of state signals transmitted by the state change device 130, or may receive respective commands, for example transmitted by a master device in the lighting control system 100 responsive to one or more change of state signals transmitted by the state change device 130. The commands may, for example, direct the first and second load control devices 110, 120 to change the states of the first and second lamps 115, 125. Alternatively, the determination may be based, for example, upon a last known state of the first and second lamps 115, 125. Based upon the determinations, the first and second load control devices 110, 120, may initiate state changes for the first and second lamps 115, 125. For example, the first load control device 110 may cause the first lamp 115 to operate from an on state to an off state and the second load control device 120 may cause the second lamp 125 to operate from an on state to an off state.

At 612, the one or more associated devices, for example the first and second load control devices 110, 120, may forward the signal to one or more other devices associated with the first and second load control devices 110, 120. For example, if the first load control device 110 is operating as a master of the lighting control system 100, the first load control device 110 may forward the signal to the second load control device 120 and/or to one or more other devices associated with the lighting control system 100, or may issue a command to the second load control device 120 to change the state of the second lamp 125 (e.g., turn the second lamp 125 on, turn the second lamp 125 off, or dim the second lamp 125). Similarly, if the second load control device 120 is operating as a master of the lighting control system 100, the second load control device 120 may forward the signal to the first load control device 110 and/or to one or more other devices associated with the lighting control system 100, or may issue a command to the first load control device 110 to change the state of the first lamp 115 (e.g., turn the first lamp 115 on, turn the first lamp 115 off, or dim the first lamp 115). After 612, the operation process 600 may conclude. It should be appreciated that 612 is optional, for example in accordance with whether or not one of the first or second load control devices 110, 120 is operating as a master of the lighting control system 100. For example, if neither of the first or second load control devices 110, 120 are operating as a master in the lighting control system 100, the operation process 600 may conclude after 610, when the first and second load control devices 110, 120 have received and/or processed the signal.

FIG. 8 depicts an example load control system. As shown, the load control system is a lighting control system 700. The lighting control system 700 includes a first load control device 710, a second load control device 720, and a device that may be referred to as a state change device 730 or a state change controller. The state change device 730 is configured to send signals to one or both of the first and second load control devices 710, 720 via wireless communication. The state change device 730 is plugged into both the switched receptacle 743 and the unswitched receptacle 744 of an outlet 742. The state change device 730 will be continuously powered by the unswitched receptacle 744. The state change device 730 includes a pair of unswitched receptacles 732. The first load control device 710 is plugged into one of the unswitched receptacles 732.

As shown, the first and second load control devices 710, 720 are table top RF dimmer switches. The lighting control system 700 further includes a first lamp 715 electrically connected to, for example plugged into, the first load control device 710, such that the first load control device 710 controls the amount of power delivered to the first lamp 715. The lighting control system 700 further includes a second lamp 725 electrically connected to, for example plugged into, the second load control device 720, such that the second load control device 720 controls the amount of power delivered to the second lamp 725.

The state change device 730 may be configured to transmit signals, for example, via radio-frequency (RF) communication signals 760. The state change device 730 may transmit signals to one or both of the first and second load control devices 710, 720, for example. The signals may be indicative of a change of state within the lighting control system 700, for example indicative of a change of state at a switched receptacle that the state change device 730 is electrically connected to. Such signals may be referred to as change of state signals, and may be interpreted by one or more devices associated with the state change device 730, for example the first and/or second load control devices 710, 720, as indications to turn on, turn off, dim, etc. respective electrical loads electrically connected to the first and/or second load control devices 710, 720.

The state change device 730 and the first load control device 710 are electrically connected to an electrical circuit 740 that includes an alternating current (AC) power source 741 and an electrical outlet 742 electrically connected to the AC power source 741. The outlet 742 includes a switched receptacle 743 and an unswitched receptacle 744. The state change device 730 is electrically connected to, for example plugged into, the switched receptacle 743 and the unswitched receptacle 744. The electrical circuit 740 also includes a wall-mounted switch 746 that is coupled in series electrical connection between the AC power source 741 and the switched receptacle 743.

The state change device 730 may derive power from the unswitched receptacle 744, regardless of whether power is applied to the switched receptacle 743, for example whether the wall-mounted switch 746 is in the on position or the off position. The state change device 730 includes a pair of unswitched receptacles 732. The state change device 730 is not limited to two receptacles as illustrated, and may include more or fewer than two receptacles. The first load control device 710 includes a plug 712 that is plugged into one of the unswitched receptacles 732 of the state change device 730 and the first lamp 715 includes a plug 717 that is plugged into the plug 712 of the first load control device 710, such that the first load control device 710 will be continuously powered by the unswitched receptacle 732.

The state change device 730 may transmit signals responsive to delivery or removal of power to the switched receptacle 743 of the outlet 742. When the wall-mounted switch 746 is operated from the off position to the on position, power may be delivered to the switched receptacle 743. The state change device 730 may sense the presence of power at the switched receptacle 743, and may transmit one or more signals, for example via RF signals 760, to one or both of the first and second load control devices 710, 720. The signals may be indicative of a change of state in the lighting control system 700. The one or more signals may be received at one or both of the first and second load control devices 710, 720. Responsive to receipt of the signals, one or both of the first and second load control devices 710, 720 may change the state of the first or second lamps 715, 725, respectively. For example, the first load control device 710 may change the state of the first lamp 715 from off to on and the second load control device 720 may change the state of the second lamp 725 from off to on.

When the wall-mounted switch 746 is operated from the on position to the off position, power may be removed from the switched receptacle 743. The state change device 730 may sense the removal of power from the switched receptacle 743, and may transmit one or more signals, for example via RF signals 760, to one or both of the first and second load control devices 710, 720. The signals may be indicative of a change of state in the lighting control system 700. The one or more signals may be received at one or both of the first and second load control devices 710, 720. Responsive to receipt of the signals, one or both of the first and second load control devices 710, 720 may change the state of the first or second lamps 715, 725, respectively. For example, the first load control device 710 may change the state of the first lamp 715 from on to off and the second load control device 720 may change the state of the second lamp 725 from on to off.

The one or more signals transmitted by the state change device 730, for example responsive to operation of the wall-mounted switch 746 from the on position to the off position or from the off position to the on position, are not limited to indicating a change of state in the lighting control system 700. For example, one or more signals transmitted by the state change device 730, for example responsive to operation of the wall-mounted switch 746, may be indicative of a load control scene (e.g., a lighting scene or preset) to be applied to one or more electrical loads (e.g., the first and second lamps 715, 725) of the lighting control system 700. A lighting scene may include respective predetermined states that are to be assumed by one or more lighting loads of the lighting control system 700. For example, a lighting scene may include one or both of the first and second lamps 715, 725 in the off state, may include one or both of the first and second lamps 715, 725 in the on state, may include one or both of the first and second lamps 715, 725 dimmed to a select dimming level, or any combination of thereof.

Respective signals indicative of one or more load control scenes may be transmitted, for example, in accordance with a number of times that the wall-mounted switch 746 is operated from one state to the other (e.g., from off to on or from on to off) within a prescribed amount of time. For example, the state change device 730 may be configured to generate and transmit one or more change of state signals if the wall-mounted switch 746 is operated from one state to the other once during the prescribed amount of time, may be configured to generate and transmit one or more signals indicative of a first lighting scene if the wall-mounted switch 746 is operated from one state to the other twice during the prescribed amount of time, may be configured to generate and transmit one or more signals indicative of a second lighting scene if the wall-mounted switch 746 is operated from one state to the other three times during the prescribed amount of time, and so on.

The state change device 730 may be deployed in a load control system that includes multiple load control devices and/or associated electrical loads, such as the lighting control system 700 depicted in FIG. 8. One of the load control devices, for example the first load control device 710 or the second load control device 720, may be configured to operate as a control entity, such as a master device, within the lighting control system 700.

The master device, or master, may operate to at least partially control functionality of the other load control devices of the load control system. The other load control devices of the load control system may be configured to assume subservient roles to the master device, such that the subservient devices will perform commands issued by the master. It should be appreciated that if the load control system includes only one load control device, the load control system may not include a master.

One of the load control devices may be designated as the master, for example by a user of the load control system. Alternatively, one of the load control devices may assume the role of the master. For example, upon association with the load control system, a load control device may poll the other load control devices of the load control system, for example via broadcast, to determine if the load control system currently has a master. If the polling load control device does not receive an answer that another device of the load control system is the master, the polling load control device may assume the role of the master in the load control system.

The master load control device may be configured to observe and/or record present state information pertaining to one or more subservient load control devices of the load control system. In an example, with reference to the lighting control system 700 shown in FIG. 8, the first load control device 710 may assume the role of master and the second load control device 720 may assume a subservient role to the first load control device 710, such that the first load control device 710 is able to at least partially control operation of the second load control device 720. The first load control device 710 may observe and/or record present state information, for example last known state information, pertaining to the second load control device 720 and/or to an electrical load electrically connected to the second load control device 720, for example information pertaining to a last known state of the second lamp 725 (e.g., whether the second lamp 725 is on or off).

The first load control device 710, in the role of master in the lighting control system 700, may be configured such that if at least one lighting load, for example the first lamp 715 or the second lamp 725, is in an on state when the state change device 730 transmits one or more change of state signals, one or more of the other lighting loads of the lighting control system 700 (e.g., each of the other lighting loads) will be operated from the on state to the off state or left in the off state. For example, if the first lamp 715 is off and the second lamp 725 is on when the wall-mounted switch 746 is operated, the state change device 730 will transmit one or more change of state signals that may be received by the first and second load control devices 710, 720. The second load control device 720 may ignore the one or more change of state signals from the state change device 730, for example in accordance with the subservient role the second load control device 720 has with respect to the first load control device 710. When the one or more change of state signals are received by the first load control device 710, the first load control device 710 will not change the state of the first lamp 715 and may forward the one or more change of state signals to the second load control device 720. Alternatively, the first load control device 710 may reference the last known state information pertaining to the second load control device 720, and may transmit an appropriate command, for example a command to turn the second lamp 725 off, to the second load control device 720. The second load control device 720, upon receipt of the forwarded one or more change of state signals or the command, will change the state of the second lamp 725 from on to off.

Alternatively, first load control device 710, in the role of master in the lighting control system 700, may be configured to maintain synchronization of the lighting loads of the lighting control system 700. For example, if the state of the first lamp 715 is changed locally at the first load control device 710, the first load control device 710 may transmit a command to the second load control device 720 that will cause second load control device 720 to change the state of the second lamp 725, thus keeping the states of the first and second lamps 715, 725, synced to one another. If the state of the second lamp 725 is changed locally at the second load control device 720, the first load control device 710 may change the state of the first lamp 715, thus keeping the states of the first and second lamps 715, 725, synced to one another.

When the wall-mounted switch 746 is operated, the state change device 730 will transmit one or more change of state signals that may be received by the first and second load control devices 710, 720. The second load control device 720 may ignore the one or more change of state signals from the state change device 730, for example in accordance with the subservient role the second load control device 720 has with respect to the first load control device 710. When the one or more change of state signals are received by the first load control device 710, the first load control device 710 will change the state of the first lamp 715, for example from on to off or from off to on, and may forward the one or more change of state signals to the second load control device 720. Alternatively, the first load control device 710 may transmit an appropriate command, for example to turn the second lamp 725 on or off, to the second load control device 720. The second load control device 720, upon receipt of the forwarded change of state signal or the command, will change the state of the second lamp 725, for example from on to off or from off to on, such that the states of the first and second lamps 715, 725 are kept in sync.

The role of master in a load control system in which the state change device 730 is deployed, for example the lighting control system 700, need not be fulfilled by a load control device of the load control system, for example the first or second load control devices 710, 720. Such a load control system may include another device configured to fulfill the role of master, for example a central controller, a main repeater, or the like. In such a configuration, one or more load control devices of the load control system, for example the first and second load control devices 710, 720, may be configured to assume subservient roles to the master, and the master may be configured to observe and/or record present state information pertaining to the subservient load control devices of the load control system. The subservient load control devices may be configured to ignore change of state signals transmitted by the state change device 730 and the master may be configured to forward change of state signals received from the state change device 730 to the subservient load control devices, or may, upon receipt of one or more change of state signals from the state change device 730, transmit appropriate commands to the subservient load control devices.

A load control system in which the state change device 730 is deployed, for example the lighting control system 700, need not include a central control entity, such as a master. For example, one or more load control devices associated with the load control system, for example the first and second load control devices 710, 720, may be configured to be aware of present state information pertaining to the other load control devices of the lighting control system 700. For example, the first load control device 710 may be configured to be aware of whether the second lamp 725 electrically connected to the second load control device 720 is on or off. Similarly, the second load control device 720 may be configured to be aware of whether the first lamp 715 electrically connected to the first load control device 710 is on or off. In such a configuration, the first and second load control devices 710, 720 may operate to ensure that the first and second lamps 715, 725 are kept in sync with one another, for example responsive to one or more change of state signals transmitted by the state change device 730.

The second load control device 720 is electrically connected to an electrical circuit 750 that includes an alternating current (AC) power source 751 and an electrical outlet 752 electrically connected to the AC power source 751. The AC power source 751 may be, for example, the AC power source 741. The outlet 752 includes two unswitched receptacles 754. The second load control device 720 includes a plug 722 that is plugged into one of the unswitched receptacles 754 of the outlet 752 and the second lamp 725 includes a plug 727 that is plugged into the plug 722 of the second load control device 720. The lighting control system 700 need not include the illustrated second load control device 720 and/or the second lamp 725. Furthermore, lighting control system 700 may include more or fewer load control devices that are associated with, for example configured to be controlled by, the state change device 730. Each of the more or fewer load control devices may be electrically connected to respective electrical devices.

The lighting control system 700 may also include one or more other devices configured to wirelessly communicate with one or both of the first and second load control devices 710, 720. As shown, the lighting control system 700 includes an occupancy and/or vacancy sensor 770, a daylight sensor 775, and a remote control 780, such as a remote keypad. The occupancy and/or vacancy sensor 770, the daylight sensor 775, and/or the remote control 780 may wirelessly communicate with one or both of the first and second load control devices 710, 720, for example using RF signals 760. For example, the occupancy and/or vacancy sensor 770, the daylight sensor 775, and/or the remote control 780 may wirelessly communicate commands to one or both of the first and second load control devices 710, 720 (e.g., turn on, turn off, or dim one or both of the first lamp 715 or the second lamp 725).

FIG. 9 depicts an example state change device 830. The state change device 830 may be deployed, for example, as the state change device 730 as depicted in FIG. 8. The state change device 830 includes a housing 834 that may be made of any suitable material, such as plastic. The housing 834 may enclose one or more electrical components of the state change device 830. The state change device 830 includes a pair of unswitched receptacles 832. As shown, the unswitched receptacles 832 extend into an outward facing surface 835 of the housing 834. One or both of the unswitched receptacles 832 may alternatively extend into any other surface of the housing 834, for example into one or more side surfaces of the housing 834. The state change device 830 may be configured to be placed into electrical communication with an electrical circuit, for example the electrical circuit 740. As shown, the state change device 830 includes two plugs. Each plug includes a pair of blades 836 and a ground pin 837 that protrude inward from the housing 834. The blades 836 and ground pins 837 are configured to be inserted into the receptacles of a standard electrical outlet, for example the switched and unswitched receptacles 743, 744 of the outlet 742. The state change device 830 may define a control interface that is accessible to a user of the state change device 830. For example, the illustrated state change device 830 includes a plurality of buttons 838 that protrude through a side of the housing 834. Each of the buttons 838 may be associated with one or more functions of the state change device 830. The state change device 830 may include a selector switch (not shown) that is configured to indicate to the state change device 830 which receptacle of an outlet that the state change device 830 is plugged into is the switched receptacle. Alternatively, the state change device 830 may be configured to detect (e.g., automatically detect) which receptacle of an outlet that the state change device 830 is plugged into is the switched receptacle.

Figure 10:
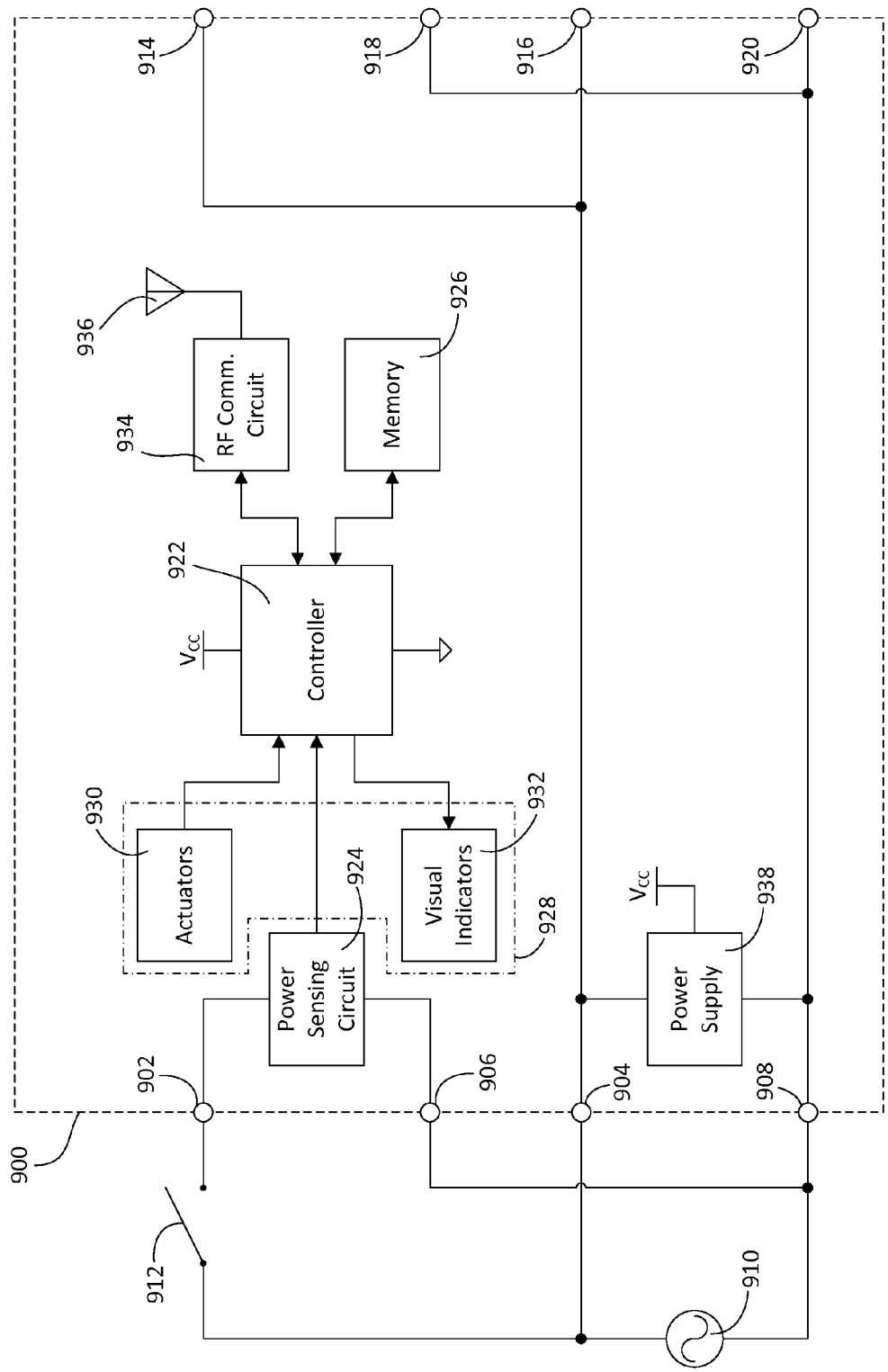
FIG. 10 is a simplified block diagram of another example state change device.

FIG. 10 is a simplified block diagram of an example state change device 900 that may be implemented as, for example, the state change device 730 illustrated in FIG. 8 or the state change device 830 illustrated in FIG. 9. As shown, the state change device 900 includes a first hot in terminal 902 that is a switched hot terminal, a second hot in terminal 904 that is an unswitched hot terminal, and respective first and second neutral in terminals 906, 908 that are configured to be electrically connected to respective switched and unswitched receptacles of an outlet powered by an alternating current (AC) power source 910. The switched receptacle may be controlled by a switch 912, such as a wall-mounted switch.

The state change device 900 includes first and second hot out terminals 914, 916 and respective first and second neutral out terminals 918, 920 that are configured to be facilitate the electrical connection of one or more electrical devices to the state change device 900. The first and second hot out terminals 914, 916 and the first and second neutral out terminals 918, 920 may be electrically connected to, for example, the unswitched receptacles 832 of the state change device 830.

The state change device 900 includes a control circuit, for example a controller 922, that is configured to control one or more functions of the state change device 900. The controller 922 may include one or more components, such as processors (e.g., microprocessors), microcontrollers, integrated circuits (e.g., field programmable gate arrays), or the like, in any combination. For example, the controller 922 may include a processor (not shown) that may execute computer-executable instructions in order to control one or more functional aspects of the state change device 900.

The state change device 900 includes a power sensing circuit 924 that is electrically connected between the first hot in terminal 902 and the first neutral in terminal 906, and is communicatively coupled to the controller 922. The power sensing circuit 924 is configured to sense when power is applied to the first hot in terminal 902 and the first neutral in terminal 906, for example when the switch 912 is closed. The power sensing circuit 924 may provide one or more signals to the controller 922 that are indicative of whether power is applied to (e.g., present at) a switched receptacle to which the state change device 900 is electrically connected, for example the switched receptacle 743 of the outlet 742. For example, the power sensing circuit 924 may provide a signal to the controller 922 when the switch 912 is operated from the open position to the closed position. The signal may be indicative of power being applied at the switched receptacle 743. The power sensing circuit 924 may provide a signal to the controller 922 when the switch 912 is operated from the closed position to the open position. The signal may be indicative of power being removed from the switched receptacle 743.

The state change device 900 includes a memory 926. The memory 926 may be communicatively coupled to the controller 922 and may operate to store information such as computer-executable instructions, configuration settings associated with operation of the state change device 900, a last known state of one or more devices associated with the state change device 900, or the like. The memory 926 may include any component suitable for storing the information. For example, the memory 926 may include one or more components of volatile and/or non-volatile memory, in any combination. The memory 926 may be internal and/or external with respect to the controller 922. For example, the memory 926 and the controller 922 may be integrated within a microchip. During operation of the state change device 900, the controller 922 may store and/or retrieve information, for instance the computer-executable instructions, from the memory 926. It should be appreciated that functionality of the controller 922 may include any combination of hardware, firmware, and/or software.

The state change device 900 includes a control interface 928 that may be operated, for example, by a user of the state change device 900. As shown, the control interface 928 includes one or more actuators 930 that may be, for example, the buttons 838 of the state change device 830, and one or more visual indicators 932, for example light emitting diodes (LEDs). Each actuator 930 may be associated with a respective visual indicator 932, for example. The control interface 928 may provide one or more inputs to the controller 922, for example a signal indicative of actuation of a corresponding one of the actuators 930. The control interface 928 may receive one or more inputs from the controller 922, for example commands to cause one or more of the visual indicators 932 to illuminate.

The state change device 900 may include a wireless communication circuit 934 that is communicatively coupled to the controller 922. The wireless communication circuit 934 may include, for example, an RF communication circuit coupled to an antenna 936. The wireless communication circuit 934 may include one or more components operable for the transmission and/or reception of information that may include signals and/or data. For instance, the wireless communication circuit 934 may include an RF transceiver, an RF transmitter, an RF receiver, an infrared (IR) transmitter, an IR receiver, a modem, and/or the like. The controller 922 may be configured to transmit information via the wireless communication circuit 934, for example a signal indicative of a change of state of the state change device 900 such as the application of power to or the removal of power from a switched receptacle to which the state change device 900 is electrically connected. The wireless communication circuit 934 may be configured with capabilities to transmit information in accordance with one or more communication schemes. For example, the wireless communication circuit 934 may be configured to be capable of transmitting information via RF communication.

The state change device 900 may include a power supply 938 configured to supply power to one or more components of the state change device 900. The power supply 938 is electrically connected between the second hot in terminal 904 and the second neutral in terminal 908, and thus may continuously derive power from the unswitched receptacle 744 of the outlet 742.

The state change device 900 may include a manual selector switch (not shown) that is configured to indicate to the state change device 900 which receptacle of an outlet that the state change device 900 is plugged into is the switched receptacle. The selector switch may be configured to swap the electrical connections of the first hot in terminal 902 and the second hot in terminal 904 and to swap the electrical connections of the first and second neutral in terminals 906, 908.

Alternatively, the state change device 900 may be configured to detect (e.g., automatically detect) which receptacle of an outlet that the state change device 900 is plugged into is the switched receptacle. To enable such autodetection, the state change device 900 may include a second power sensing circuit (not shown) that is electrically connected between the second hot in terminal 904 and the second neutral in terminal 908 and is communicatively coupled to the controller 922. The controller 922 may be configured to determine which one of the first or second power sensing circuits is supplied with constant power, and based upon that determination, to respond to signals transmitted from the other of the first or second power sensing circuits that is not supplied with constant power. In accordance with such a configuration of the state change device 900, the power supply 938 may be appropriately coupled to both the first and second hot in terminals 902, 904 to draw current from the unswitched receptacle of the outlet.

It should be appreciated that one or more of the above-described components of the state change device 900, such as the power sensing circuit 924, the memory 926, and/or the wireless communication circuit 934, may be at least partially integrated with (e.g., completely integrated with) the controller 922, for example within a single microchip, such as an integrated circuit.

Figure 11:
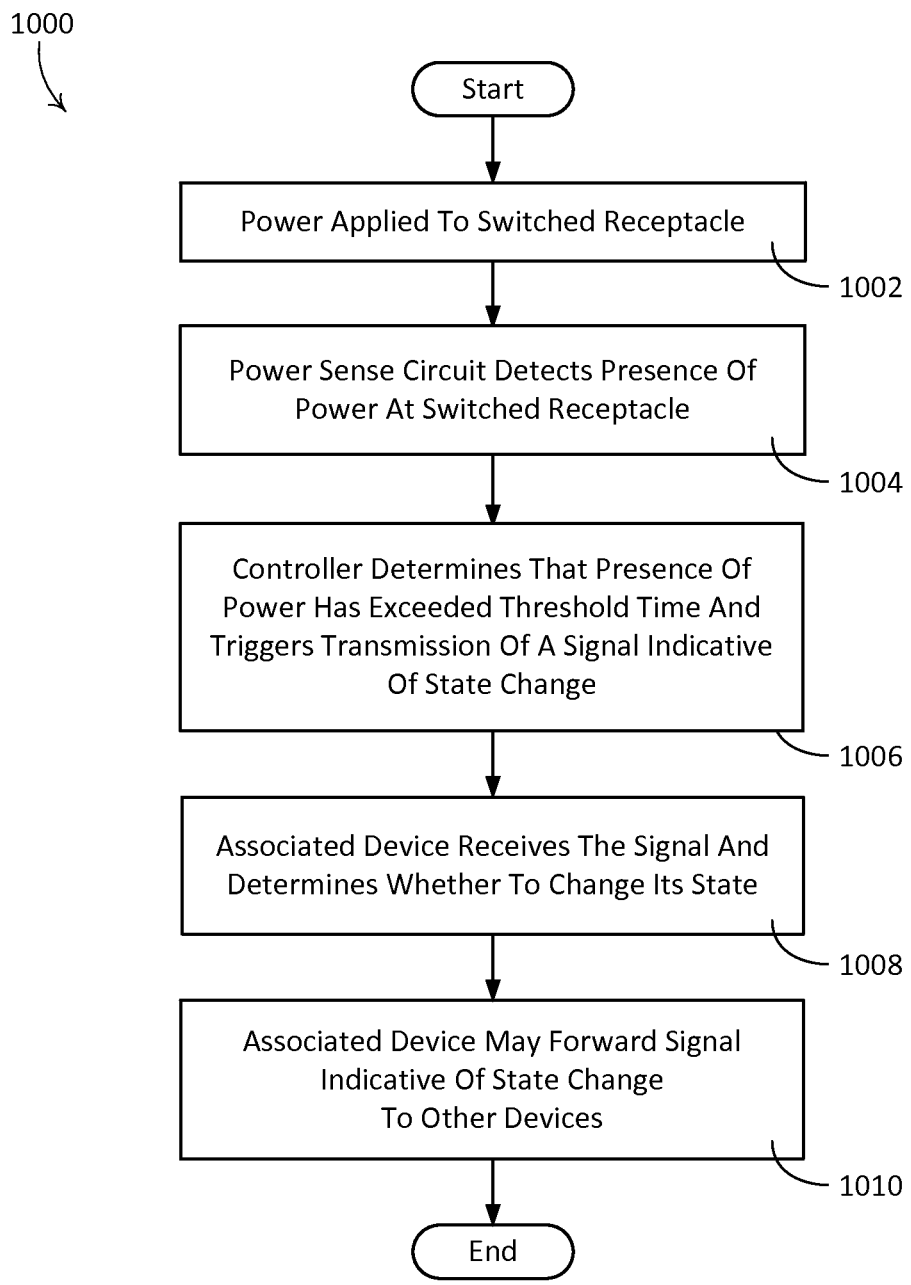
FIG. 11 is a functional diagram illustrating operation of an example state change device when power is applied to the switched AC receptacle.

FIG. 11 is a functional diagram illustrating an example operation process 1000 of a state change device, for example the state change device 730, 830, or 900, when power is applied to a switched AC receptacle to which the state change device is electrically connected, for example the switched receptacle 743 of the outlet 742.

The operation process 1000 begins at 1002, when power is applied to the switched receptacle to which the state change device, for example the state change device 900, is electrically connected. At 1004, the power sensing circuit 924 determines that power has been supplied to the switched receptacle. The power sensing circuit 924 may detect the presence of power at the switched receptacle. The power sensing circuit 924 may, responsive to detecting power at the switched receptacle, provide a signal to the controller 922 that indicates power has been applied at the switched receptacle. The power sensing circuit 924 may continue to send signals to the controller 922 to indicate the continued presence of power at the switched receptacle.

At 1006, the controller 922 may receive one or more signals from the power sensing circuit 924 indicating that power has been applied at the switched receptacle. The controller 922 may then wait until a predetermined amount of time has elapsed. The predetermined amount of time may be a state of change threshold time, upon expiration of which the controller 922 may trigger the wireless communication circuit 934 to transmit a signal indicative of a change of state of the state change device 900. The signal may indicate, for example, that the state of the state change device 900 has changed from an off state to an on state. The controller 922 may cause the wireless communication circuit 934 to transmit the signal via the antenna 936. The controller 922 may cause the wireless communication circuit 934 to transmit the signal one or more times, for example in accordance with a configuration setting that is stored in the memory 926 and retrieved by the controller 922.

The one or more signals may be broadcast to one or more devices that are associated with the state change device 900. For example, with reference to the example lighting control system 700 depicted in FIG. 8, the state change device 830 may broadcast the signal to the first and second load control devices 710, 720 via RF signals 760.

At 1008, upon receiving the signal, the first and second load control devices 710, 720 may determine whether to change the states of respective electrical loads electrically connected to the first and second load control devices 710, 720, for example the first and second lamps 715, 725. For example, the first and second load control devices 710, 720 may receive one or more forwarded change of state signals transmitted by the state change device 730, or may receive respective commands, for example transmitted by a master device in the lighting control system 700 responsive to one or more change of state signals transmitted by the state change device 730. The commands may, for example, direct the first and second load control devices 710, 720 to change the states of the first and second lamps 715, 725. Alternatively, the determination may be based, for example, upon a last known state of the first and second lamps 715, 725. Based upon the determinations, the first and second load control devices 710, 720, may initiate state changes for the first and second lamps 715, 725. For example, the first load control device 710 may cause the first lamp 715 to operate from an off state to an on state and the second load control device 720 may cause the second lamp 725 to operate from an off state to an on state.

At 1010, the one or more associated devices, for example the first and second load control devices 710, 720, may forward the signal to one or more other devices associated with the first and second load control devices 710, 720. For example, if the first load control device 710 is operating as a master of the lighting control system 700, the first load control device 710 may forward the signal to the second load control device 720 and/or to one or more other devices associated with the lighting control system 700, or may issue a command to the second load control device 720 to change the state of the second lamp 725 (e.g., turn the second lamp 725 on, turn the second lamp 725 off, or dim the second lamp 725). Similarly, if the second load control device 720 is operating as a master of the lighting control system 700, the second load control device 720 may forward the signal to the first load control device 710 and/or to one or more other devices associated with the lighting control system 700, or may issue a command to the first load control device 710 to change the state of the first lamp 715 (e.g., turn the first lamp 715 on, turn the first lamp 715 off, or dim the first lamp 715). After 1010, the operation process 1000 may conclude. It should be appreciated that 1010 is optional, for example in accordance with whether or not one of the first or second load control devices 710, 720 is operating as a master of the lighting control system 700. For example, if neither of the first or second load control devices 710, 720 are operating as a master in the lighting control system 700, the operation process 1000 may conclude after 1008, when the first and second load control devices 710, 720 have received and/or processed the signal.

Figure 12:
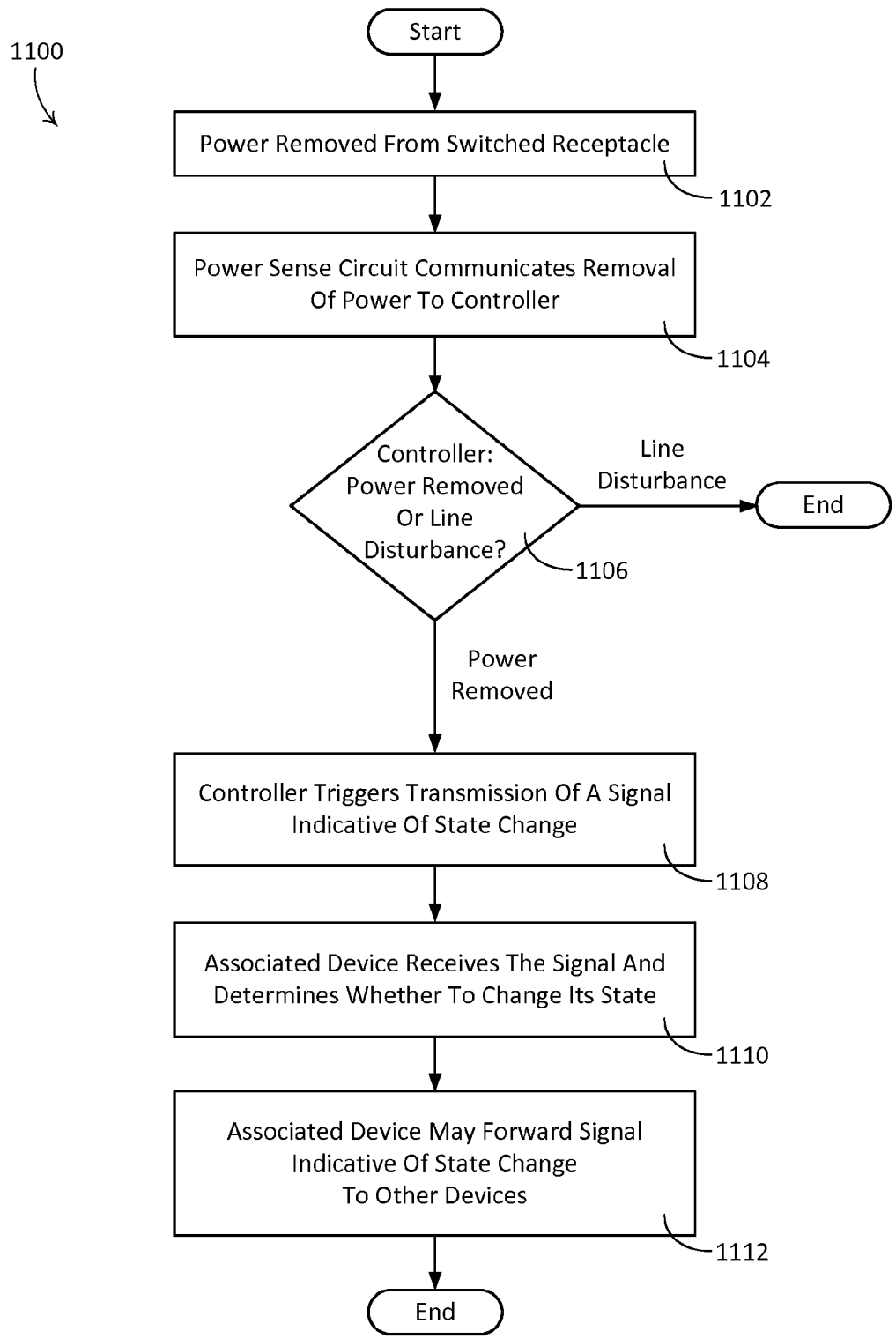
FIG. 12 is a functional diagram illustrating operation of an example state change device when power is removed from the switched AC receptacle.

FIG. 12 is a functional diagram illustrating an example operation process 1100 of a state change device, for example the state change devices 730, 830 or 900, when power is removed from a switched AC receptacle to which the state change device is electrically connected, for example the switched receptacle 743 of the outlet 742.

The operation process 1100 begins at 1102, when power is removed from the switched receptacle to which the state change device, for example the state change device 900, is electrically connected. At 1104, the power sensing circuit 924 determines that power has been removed from the switched receptacle. The power sensing circuit 924 may detect the absence of power at the switched receptacle. The power sensing circuit 924 may, responsive to detecting the lack of power at the switched receptacle, provide a signal to the controller 922 that indicates power has been removed from the switched receptacle. Alternatively, the power sensing circuit 924 may cease sending signals to the controller 922 that indicate the continued presence of power at the switched receptacle.

At 1106, the controller 922 may receive one or more signals from the power sensing circuit 924 indicating that power has been removed from the switched receptacle. The controller 922 may then determine whether power has actually been removed or whether a line disturbance has occurred. The controller 922 may make this determination, for example, by waiting for a predetermined interval of time and listening for one or more signals from the power sensing circuit 924 that indicate that power has been applied at the switched receptacle. If the controller 922 receives one or more such signals, the controller 922 may determine that a line disturbance has occurred and the operation process 1100 may conclude. If predetermined interval expires and the controller 922 has not received one or more such signals, the controller 922 may determine that power has been removed from the switched receptacle.

At 1108, after determining that power has been removed from the switched receptacle, the controller 922 may trigger the wireless communication circuit 934 to transmit a signal indicative of a change of state of the state change device 900. The signal may indicate, for example, that the state of the state change device 900 has changed from an on state to an off state. The controller 922 may cause the wireless communication circuit 934 to transmit the signal via the antenna 936. The controller 922 may cause the wireless communication circuit 934 to transmit the signal one or more times, for example in accordance with a configuration setting stored in the memory 926 and is retrieved by the controller 922.

The one or more signals may be broadcast to one or more devices that are associated with the state change device 900. For example, with reference to the example lighting control system 700 depicted in FIG. 8, the state change device 830 may broadcast the signal to the first and second load control devices 710, 720 via RF signals 760.

At 1110, upon receiving the signal, the first and second load control devices 710, 720 may determine whether to change the states of respective electrical loads electrically connected to the first and second load control devices 710, 720, for example the first and second lamps 715, 725. For example, the first and second load control devices 710, 720 may receive one or more forwarded change of state signals transmitted by the state change device 730, or may receive respective commands, for example transmitted by a master device in the lighting control system 700 responsive to one or more change of state signals transmitted by the state change device 730. The commands may, for example, direct the first and second load control devices 710, 720 to change the states of the first and second lamps 715, 725. Alternatively, the determination may be based, for example, upon a last known state of the first and second lamps 715, 725. Based upon the determinations, the first and second load control devices 710, 720, may initiate state changes for the first and second lamps 715, 725. For example, the first load control device 710 may cause the first lamp 715 to operate from an on state to an off state and the second load control device 720 may cause the second lamp 725 to operate from an on state to an off state.

At 1112, the one or more associated devices, for example the first and second load control devices 710, 720, may forward the signal to one or more other devices associated with the first and second load control devices 710, 720. For example, if the first load control device 710 is operating as a master of the lighting control system 700, the first load control device 710 may forward the signal to the second load control device 720 and/or to one or more other devices associated with the lighting control system 700, or may issue a command to the second load control device 720 to change the state of the second lamp 725 (e.g., turn the second lamp 725 on, turn the second lamp 725 off, or dim the second lamp 725). Similarly, if the second load control device 720 is operating as a master of the lighting control system 700, the second load control device 720 may forward the signal to the first load control device 710 and/or to one or more other devices associated with the lighting control system 700, or may issue a command to the first load control device 710 to change the state of the first lamp 715 (e.g., turn the first lamp 715 on, turn the first lamp 715 off, or dim the first lamp 715). After 1112, the operation process 1100 may conclude. It should be appreciated that 1112 is optional, for example in accordance with whether or not one of the first or second load control devices 710, 720 is operating as a master of the lighting control system 700. For example, if neither of the first or second load control devices 710, 720 are operating as a master in the lighting control system 700, the operation process 1100 may conclude after 1110, when the first and second load control devices 710, 720 have received and/or processed the signal.

FIG. 13 depicts an example load control system. As shown, the load control system is a lighting control system 1200. The lighting control system 1200 includes a load control device 1210 and a device that may be referred to as a state change device 1230 or a state change controller. The state change device 1230 is configured to send signals to and/or receive signals from the load control device 1210 via wireless communication. The state change device 1230 is plugged into both the switched receptacle 1243 and the unswitched receptacle 1244 of an outlet 1242. The state change device 1230 will be continuously powered by the unswitched receptacle 1244. The state change device 1230 includes a pair of receptacles 1232. The state change device 1230 includes a load control circuit, such that the state change device 1230 may function as a load control device. A first one of the receptacles 1232 is electrically connected to the load control circuit, and is configured as a dimmed receptacle 1231. A second one of the receptacles 1232 is configured as an unswitched receptacle 1233.

The lighting control system 1200 further includes a first lamp 1215 electrically connected to, for example plugged into, the state change device 1230, such that the state change device 1230 controls the amount of power delivered to the first lamp 1215. As shown, the load control device 1210 is a table top RF dimmer switch. The lighting control system 1200 further includes a second lamp 1225 electrically connected to, for example plugged into, the load control device 1210, such that the load control device 1210 controls the amount of power delivered to the second lamp 1225.

The state change device 1230 may be configured to transmit and/or receive the signals, for example, via radio-frequency (RF) communication signals 1260. The state change device 1230 may transmit signals to the load control device 1210, for example. The signals may be indicative of a change of state within the lighting control system 1200, for example indicative of a change of state at a switched receptacle that the state change device 1230 is electrically connected to. Such signals may be referred to as change of state signals, and may be interpreted by one or more devices associated with the state change device 1230, for example the load control device 1210, as indications to turn on, turn off, dim, etc. respective electrical loads electrically connected to the load control device 1210.

The state change device 1230 is electrically connected to an electrical circuit 1240 that includes an alternating current (AC) power source 1241 and an electrical outlet 1242 electrically connected to the AC power source 1241. The outlet 1242 includes a switched receptacle 1243 and an unswitched receptacle 1244. The state change device 1230 is electrically connected to, for example plugged into, the switched receptacle 1243 and the unswitched receptacle 1244. The electrical circuit 1240 also includes a wall-mounted switch 1246 that is coupled in series electrical connection between the AC power source 1241 and the switched receptacle 1243.

The state change device 1230 may derive power from the unswitched receptacle 1244, regardless of whether power is applied to the switched receptacle 1243, for example whether the wall-mounted switch 1246 is in the on position or the off position. The state change device 1230 includes a pair of receptacles 1232. The state change device 1230 is not limited to two receptacles 1232 as illustrated, and may include more or fewer than two receptacles. As shown, the receptacles 1232 are configured as a dimmed receptacle 1231 and an unswitched receptacle 1233. The first lamp 1215 includes a plug 1217 that is plugged into the dimmed receptacle 1231 of the state change device 1230, such that the first lamp 1215 may be switched by the wall-mounted switch 1246 and dimmed by the load control circuit of the state change device 1230.

The state change device 1230 may transmit signals responsive to delivery or removal of power to the switched receptacle 1243 of the outlet 1242. When the wall-mounted switch 1246 is operated from the off position to the on position, power may be delivered to the switched receptacle 1243. The state change device 1230 may sense the presence of power at the switched receptacle 1243, and may transmit one or more signals, for example via RF signals 1260, to the load control device 1210. The signals may be indicative of a change of state in the lighting control system 1200. The one or more signals may be received at the load control device 1210. Responsive to receipt of the signals, the load control device 1210 may change the state of the second lamp 1225. For example, the load control device 1210 may change the state of the second lamp 1225 from off to on.

When the wall-mounted switch 1246 is operated from the on position to the off position, power may be removed from the switched receptacle 1243. The state change device 1230 may sense the removal of power from the switched receptacle 1243, and may transmit one or more signals, for example via RF signals 1260, to the load control device 1210. The signals may be indicative of a change of state in the lighting control system 1200. The one or more signals may be received at the load control device 1210. Responsive to receipt of the signals, the load control device 1210 may change the state of the second lamp 1225. For example, the load control device 1210 may change the state of the second lamp 1225 from on to off.

The one or more signals transmitted by the state change device 1230, for example responsive to operation of the wall-mounted switch 1246 from the on position to the off position or from the off position to the on position, are not limited to indicating a change of state in the lighting control system 1200. For example, one or more signals transmitted by the state change device 1230, for example responsive to operation of the wall-mounted switch 1246, may be indicative of a load control scene (e.g., a lighting scene or preset) to be applied to one or more electrical loads (e.g., the first and second lamps 1215, 1225) of the lighting control system 1200. A lighting scene may include respective predetermined states that are to be assumed by one or more lighting loads of the lighting control system 1200. For example, a lighting scene may include one or both of the first and second lamps 1215, 1225 in the off state, may include one or both of the first and second lamps 1215, 1225 in the on state, may include one or both of the first and second lamps 1215, 1225 dimmed to a select dimming level, or any combination of thereof.

Respective signals indicative of one or more load control scenes may be transmitted, for example, in accordance with a number of times that the wall-mounted switch 1246 is operated from one state to the other (e.g., from off to on or from on to off) within a prescribed amount of time. For example, the state change device 1230 may be configured to generate and transmit one or more change of state signals if the wall-mounted switch 1246 is operated from one state to the other once during the prescribed amount of time, may be configured to generate and transmit one or more signals indicative of a first lighting scene if the wall-mounted switch 1246 is operated from one state to the other twice during the prescribed amount of time, may be configured to generate and transmit one or more signals indicative of a second lighting scene if the wall-mounted switch 1246 is operated from one state to the other three times during the prescribed amount of time, and so on.

The state change device 1230 may be deployed in a load control system that includes one or more load control devices and/or associated electrical loads in addition to the state change device 1230, such as the lighting control system 1200 depicted in FIG. 13. One of the load control devices, for example the state change device 1230 or the load control device 1210, may be configured to operate as a control entity, such as a master device, within the lighting control system 1200.

The master device, or master, may operate to at least partially control functionality of the other load control devices of the load control system. The other load control devices of the load control system may be configured to assume subservient roles to the master device, such that the subservient devices will perform commands issued by the master. It should be appreciated that if the load control system includes only one load control device, the load control system may not include a master.

One of the load control devices may be designated as the master, for example by a user of the load control system. Alternatively, one of the load control devices may assume the role of the master. For example, upon association with the load control system, a load control device may poll the other load control devices of the load control system, for example via broadcast, to determine if the load control system currently has a master. If the polling load control device does not receive an answer that another device of the load control system is the master, the polling load control device may assume the role of the master in the load control system.

The master load control device may be configured to observe and/or record present state information pertaining to one or more subservient load control devices of the load control system. In an example, with reference to the lighting control system 1200 shown in FIG. 13, the state change device 1230 may assume the role of master and the load control device 1210 may assume a subservient role to the state change device 1230, such that the state change device 1230 is able to at least partially control operation of the load control device 1210. The state change device 1230 may observe and/or record present state information, for example last known state information, pertaining to the load control device 1210 and/or to an electrical load electrically connected to the load control device 1210, for example information pertaining to a last known state of the second lamp 1225 (e.g., whether the second lamp 1225 is on or off).

The state change device 1230, in the role of master in the lighting control system 1200, may be configured such that if at least one lighting load, for example the first lamp 1215 or the second lamp 1225, is in an on state when the state change device 1230 transmits one or more change of state signals, one or more of the other lighting loads of the lighting control system 1200 (e.g., each of the other lighting loads) will be operated from the on state to the off state or left in the off state. For example, if the first lamp 1215 is off and the second lamp 1225 is on when the wall-mounted switch 1246 is operated, the state change device 1230 will not change the state of the first lamp 1215 and will transmit one or more change of state signals or an appropriate command, for example a command to turn the second lamp 1225 off, to the load control device 1210. The load control device 1210, upon receipt of the one or more change of state signals or the command, will change the state of the second lamp 1225 from on to off.

Alternatively, the state change device 1230, in the role of master in the lighting control system 1200, may be configured to maintain synchronization of the lighting loads of the lighting control system 1200. For example, if the state of the first lamp 1215 is changed locally at the state change device 1230, the state change device 1230 may transmit a command to the load control device 1210 that will cause load control device 1210 to change the state of the second lamp 1225, thus keeping the states of the first and second lamps 1215, 1225, synced to one another. If the state of the second lamp 1225 is changed locally at the load control device 1210, the state change device 1230 may change the state of the first lamp 1215, thus keeping the states of the first and second lamps 1215, 1225, synced to one another.

When the wall-mounted switch 1246 is operated, the state change device 1230 will change the state of the first lamp 1215, for example from on to off or from off to on, and may transmit one or more change of state signals that may be received by the load control device 1210. The load control device 1210 may ignore the one or more change of state signals from the state change device 1230, for example in accordance with the subservient role the load control device 1210 has with respect to the state change device 1230. Alternatively, the state change device 1230 will change the state of the first lamp 1215, for example from on to off or from off to on, and may transmit an appropriate command, for example to turn the second lamp 1225 on or off, to the load control device 1210. The load control device 1210, upon receipt of the one or more change of state signals or the command, will change the state of the second lamp 1225, for example from on to off or from off to on, such that the states of the first and second lamps 1215, 1225 are kept in sync.

The role of master in a load control system in which the state change device 1230 is deployed, for example the lighting control system 1200, need not be fulfilled by a load control device of the load control system, for example the state change device 1230 or the load control device 1210. Such a load control system may include another device configured to fulfill the role of master, for example a central controller, a main repeater, or the like. In such a configuration, one or more load control devices of the load control system, for example the state change device 1230 or the load control device 1210, may be configured to assume subservient roles to the master, and the master may be configured to observe and/or record present state information pertaining to the subservient load control devices of the load control system. The subservient load control devices may be configured to ignore change of state signals transmitted by the state change device 1230 and the master may be configured to forward change of state signals received from the state change device 1230 to the subservient load control devices, or may, upon receipt of one or more change of state signals from the state change device 1230, transmit appropriate commands to the subservient load control devices.

A load control system in which the state change device 1230 is deployed, for example the lighting control system 1200, need not include a central control entity, such as a master. For example, one or more load control devices associated with the load control system, for example the state change device 1230 and the load control device 1210, may be configured to be aware of present state information pertaining to the other load control devices of the lighting control system 1200. For example, the state change device 1230 may be configured to be aware of whether the second lamp 1225 electrically connected to the load control device 1210 is on or off. Similarly, the load control device 1210 may be configured to be aware of whether the first lamp 1215 electrically connected to the state change device 1230 is on or off. In such a configuration, the state change device 1230 and the load control device 1210 may operate to ensure that the first and second lamps 1215, 1225 are kept in sync with one another.

The load control device 1210 is electrically connected to an electrical circuit 1250 that includes an alternating current (AC) power source 1251 and an electrical outlet 1252 electrically connected to the AC power source 1251. The AC power source 1251 may be, for example, the AC power source 1241. The outlet 1252 includes two unswitched receptacles 1254. The load control device 1210 includes a plug 1212 that is plugged into one of the unswitched receptacles 1254 of the outlet 1252 and the second lamp 1225 includes a plug 1227 that is plugged into the plug 1212 of the load control device 1210. The lighting control system 1200 need not include the illustrated load control device 1210 and/or the second lamp 1225. Furthermore, lighting control system 1200 may include more or fewer load control devices that are associated with, for example configured to be controlled by, the state change device 1230. Each of the more or fewer load control devices may be electrically connected to respective electrical devices.

The lighting control system 1200 may also include one or more other devices configured to wirelessly communicate with one or both of the load control device 1210 and the state change device 1230. As shown, the lighting control system 1200 includes an occupancy and/or vacancy sensor 1270, a daylight sensor 1275, and a remote control 1280, such as a remote keypad. The occupancy and/or vacancy sensor 1270, the daylight sensor 1275, and/or the remote control 1280 may wirelessly communicate with one or both of the load control device 1210 and the state change device 1230, for example using RF signals 1260. For example, the occupancy and/or vacancy sensor 1270, the daylight sensor 1275, and/the or remote control 1280 may wirelessly communicate commands to one or both of the load control device 1210 and the state change device 1230 (e.g., turn on, turn off, or dim one or both of the first lamp 1215 or the second lamp 1225).

If the state change device 1230 assumes a subservient role to another device of the lighting control system 1200, for example the load control device 1210, the state change device 1230 may be configured to receive commands from one or more other devices of the lighting control system 1200. For example, the state change device 1230 may receive commands from the load control device 1210, the occupancy and/or vacancy sensor 1270, the daylight sensor 1275, and/or the remote control 1280, for example via RF signals 1260. The state change device 1230 may be configured to execute received commands. The state change device 1230 may be configured to evaluate received commands. For example, the state change device 1230 may compare one or more received commands against a present state of one or more devices electrically connected to the state change device 1230, such as the first lamp 1215. The state change device 1230 may be configured to, based on the evaluation of the one or more received commands, follow or ignore respective ones of the one or more received commands.

FIG. 14 depicts an example state change device 1330. The state change device 1330 may be deployed, for example, as the state change device 1230 as depicted in FIG. 13. The state change device 1330 includes a housing 1334 that may be made of any suitable material, such as plastic. The housing 1334 may enclose one or more electrical components of the state change device 1330. The state change device 1330 includes a pair of receptacles 1332. A first one of the receptacles 1332 is configured as a dimmed receptacle 1331 and a second one of the receptacles 1332 is configured as an unswitched receptacle 1333. The dimmed receptacle 1331 may not have an opening to receive a ground pin of a grounded plug, and may be marked to identify the receptacle as a dimmed receptacle. As shown, the receptacles 1332 extend into an outward facing surface 1335 of the housing 1334. One or both of the receptacles 1332 may alternatively extend into any other surface of the housing 1334, for example into one or more side surfaces of the housing 1334. The state change device 1330 may be configured to be placed into electrical communication with an electrical circuit, for example the electrical circuit 1240. As shown, the state change device 1330 includes two plugs. Each plug includes a pair of blades 1336 and a ground pin 1337 that protrude inward from the housing 1334. The blades 1336 and ground pins 1337 are configured to be inserted into the receptacles of a standard electrical outlet, for example the switched and unswitched receptacles 1243, 1244 of the outlet 1242. The state change device 1330 may define a control interface that is accessible to a user of the state change device 1330. For example, the illustrated state change device 1330 includes a plurality of buttons 1338 that protrude through a side of the housing 1334. Each of the buttons 1338 may be associated with one or more functions of the state change device 1330. The state change device 1330 may include a selector switch (not shown) that is configured to indicate to the state change device 1330 which receptacle of an outlet that the state change device 1330 is plugged into is the switched receptacle. Alternatively, the state change device 1330 may be configured to detect (e.g., automatically detect) which receptacle of an outlet that the state change device 1330 is plugged into is the switched receptacle.

Figure 15:
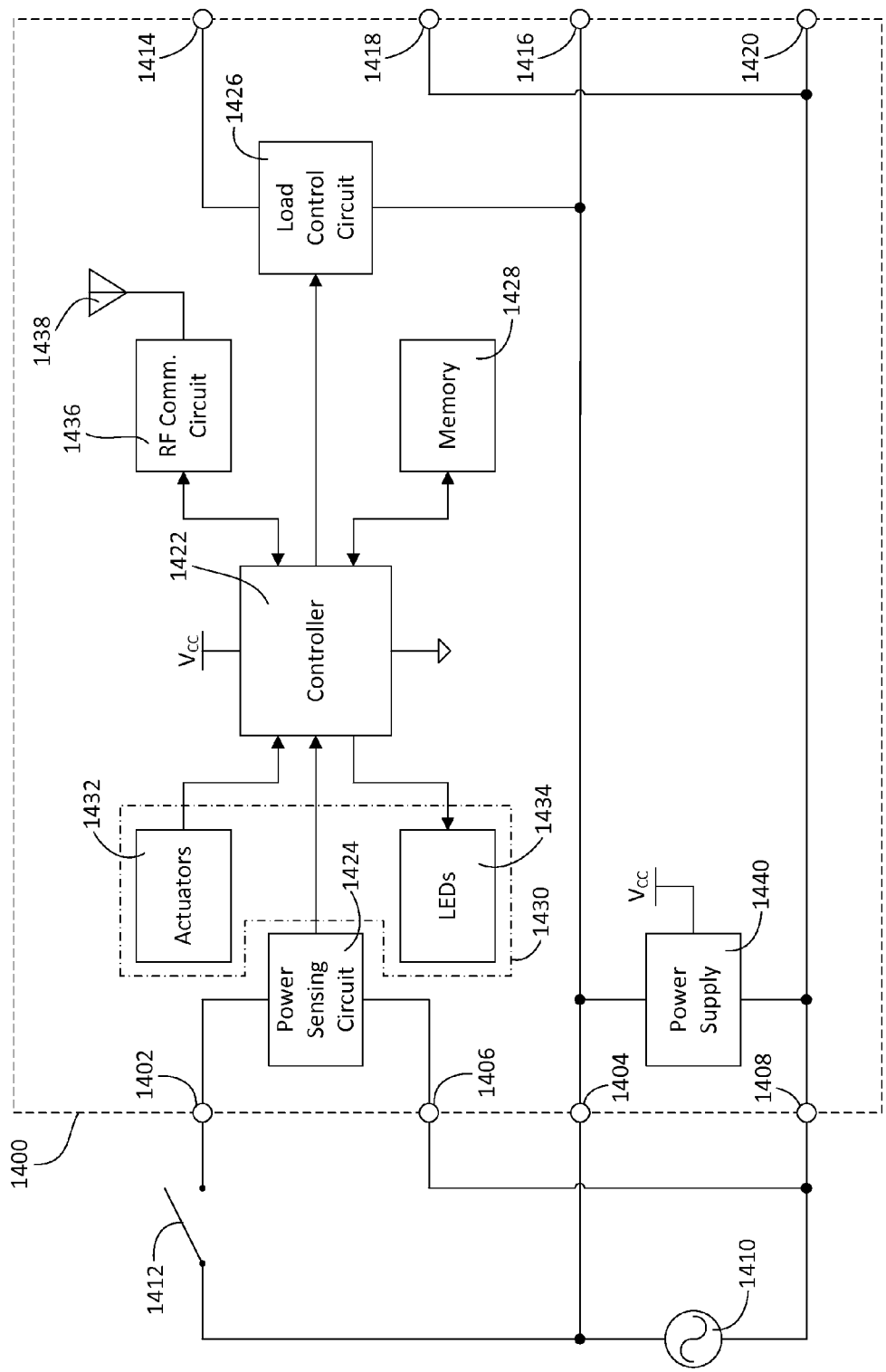
FIG. 15 is a simplified block diagram of an example state change device.

FIG. 15 is a simplified block diagram of an example state change device 1400 that may be implemented as, for example, the state change device 1230 illustrated in FIG. 13 of the state change device 1330 illustrated in FIG. 14. As shown, the state change device 1400 includes a first hot in terminal 1402 that is a switched hot terminal, a second hot in terminal 1404 that is an unswitched hot terminal, and respective first and second neutral in terminals 1406, 1408 that are configured to be electrically connected to respective switched and unswitched receptacles of an outlet powered by an alternating current (AC) power source 1410. The switched receptacle may be controlled by a switch 1412, such as a wall-mounted switch.

The state change device 1400 includes first and second hot out terminals 1414, 1416 and respective first and second neutral out terminals 1418, 1420 that are configured to be facilitate the electrical connection of one or more electrical devices to the state change device 1400. The first and second hot out terminals 1414, 1416 and the first and second neutral out terminals 1418, 1420 may be electrically connected to, for example, the dimmed and unswitched receptacles 1331, 1333, respectively, of the state change device 1330.

The state change device 1400 includes a control circuit, for example a controller 1422, that is configured to control one or more functions of the state change device 1400. The controller 1422 may include one or more components, such as processors (e.g., microprocessors), microcontrollers, integrated circuits (e.g., field programmable gate arrays), or the like, in any combination. For example, the controller 1422 may include a processor (not shown) that may execute computer-executable instructions in order to control one or more functional aspects of the state change device 1400.

The state change device 1400 includes a power sensing circuit 1424 that is electrically connected between the first hot in terminal 1402 and the first neutral in terminal 1406, and is communicatively coupled to the controller 1422. The power sensing circuit 1424 is configured to sense when power is applied to the first hot in terminal 1402 and the first neutral in terminal 1406, for example when the switch 1412 is closed. The power sensing circuit 1424 may provide one or more signals to the controller 1422 that are indicative of whether power is applied to (e.g., present at) a switched receptacle to which the state change device 1400 is electrically connected, for example the switched receptacle 1243 of the outlet 1242. For example, the power sensing circuit 1424 may provide a signal to the controller 1422 when the switch 1412 is operated from the open position to the closed position. The signal may be indicative of power being applied at the switched receptacle 1243. The power sensing circuit 1424 may provide a signal to the controller 1422 when the switch 1412 is operated from the closed position to the open position. The signal may be indicative of power being removed from the switched receptacle 1243.

The state change device 1400 includes a load control circuit 1426 that is electrically connected between the first hot out terminal 1414 and the first neutral out terminal 1418. The load control circuit 1426 may be used to control the amount of power delivered to an electrical load electrically connected to the first hot out terminal 1414 and the first neutral out terminal 1418, for example a lighting load plugged into the dimmed receptacle 1331 of the state change device 1330. In this regard, the state change device 1400 can be configured to function as a load control device.

The load control circuit 1426 includes a controllably conductive device (not shown in FIG. 15), a drive circuit (not shown in FIG. 15), and a zero-cross detection circuit (not shown in FIG. 15). The controllably conductive device may be, for example, a bidirectional semiconductor switch, such as a triac, that is configured to be electrically coupled between the AC power source 1410 and the electrical load (which may be referred to as the load) electrically connected to the first hot out terminal 1414 and the first neutral out terminal 1418. The controllably conductive device may be operable between a non-conductive state in which the gate is open such that AC from the AC power source 1410 is not delivered to the load and a conductive state in which the gate is closed such that AC from the AC power source 1410 passes through the controllably conductive device and is delivered to the load. The controllably conductive device may be referred to as "off" when in the non-conductive state and "on" when in the conductive state. Alternatively, the controllably conductive device may be implemented as a relay or any suitable bidirectional semiconductors switch, such as, for example, a field-effect transistor (FET) in a rectifier bridge, two FETs in anti-series connection, or one or more insulated-gate bipolar junction transistors (IGBTs).

The drive circuit is electrically connected between the controller 1422 and the controllably conductive device and is communicatively coupled to the controller 1422. The drive circuit may include circuitry configured to convert control signals issued by the controller 1422 into triggering signals that may trigger the controllably conductive device to operate between the non-conductive state and the conductive state. The zero-cross detection circuit is configured to detect zero crossing events associated with an AC waveform generated by the AC power source 1410.

The controller 1422 may issue control signals to the drive circuit in accordance with a prescribed interval. For example, the controller 1422 may be made aware of a zero crossing event associated with an AC line voltage generated by the AC power source 1410, for example via the zero-cross detection circuit. The controller 1422 may be configured to, upon detection of the zero crossing, issue a control signal to the drive circuit to operate the controllably conductive device from the conductive state to the non-conductive state (i.e., to open the gate) for a duration of the prescribed interval and, upon expiration of the interval, to operate the controllably conductive device from the non-conductive state to the conductive state (i.e., to close the gate). The expiration of the interval may substantially coincide with a subsequent, consecutive zero crossing event associated with the AC waveform generated by the AC power source 1410.

The state change device 1400 includes a memory 1428. The memory 1428 may be communicatively coupled to the controller 1422 and may operate to store information such as computer-executable instructions, configuration settings associated with operation of the state change device 1400, a last known state of one or more devices associated with the state change device 1400, or the like. The memory 1428 may include any component suitable for storing the information. For example, the memory 1428 may include one or more components of volatile and/or non-volatile memory, in any combination. The memory 1428 may be internal and/or external with respect to the controller 1422. For example, the memory 1428 and the controller 1422 may be integrated within a microchip. During operation of the state change device 1400, the controller 1422 may store and/or retrieve information, for instance the computer-executable instructions, from the memory 1428. It should be appreciated that functionality of the controller 1422 may include any combination of hardware, firmware, and/or software.

The state change device 1400 includes a control interface 1430 that may be operated, for example, by a user of the state change device 1400. As shown, the control interface 1430 includes one or more actuators 1432 that may be, for example, the buttons 1338 of the state change device 1330, and one or more visual indicators 1434, for example light emitting diodes (LEDs). Each actuator 1432 may be associated with a respective visual indicator 1434, for example. The control interface 1430 may provide one or more inputs to the controller 1422, for example a signal indicative of actuation of a corresponding one of the actuators 1432. The control interface 1430 may receive one or more inputs from the controller 1422, for example commands to cause one or more of the visual indicators 1434 to illuminate.

The state change device 1400 may include a wireless communication circuit 1436 that is communicatively coupled to the controller 1422. The wireless communication circuit 1436 may include, for example, an RF communication circuit coupled to an antenna 1438. The wireless communication circuit 1436 may include one or more components operable for the transmission and/or reception of information that may include signals and/or data. For instance, the wireless communication circuit 1436 may include an RF transceiver, an RF transmitter, an RF receiver, an infrared (IR) transmitter, an IR receiver, a modem, and/or the like. The controller 1422 may be configured to transmit information via the wireless communication circuit 1436, for example a signal indicative of a change of state of the state change device 1400, such as the application of power to or the removal of power from a switched receptacle to which the state change device 1400 is electrically connected. The wireless communication circuit 1436 may be configured with capabilities to transmit information in accordance with one or more communication schemes. For example, the wireless communication circuit 1436 may be configured to be capable of transmitting information via RF communication.

The state change device 1400 may include a power supply 1440 configured to supply power to one or more components of the state change device 1400. The power supply 1440 is electrically connected between the second hot in terminal 1404 and the second neutral in terminal 1408, and thus may continuously derive power from the unswitched receptacle 1244 of the outlet 1242.

The state change device 1400 may include a manual selector switch (not shown) that is configured to indicate to the state change device 1400 which receptacle of an outlet that the state change device 1400 is plugged into is the switched receptacle. The selector switch may be configured to swap the electrical connections of the first hot in terminal 1402 and the second hot in terminal 1404 and to swap the electrical connections of the first and second neutral in terminals 1406, 1408.

Alternatively, the state change device 1400 may be configured to detect (e.g., automatically detect) which receptacle of an outlet that the state change device 1400 is plugged into is the switched receptacle. To enable such autodetection, the state change device 1400 may include a second power sensing circuit (not shown) that is electrically connected between the second hot in terminal 1404 and the second neutral in terminal 1408 and is communicatively coupled to the controller 1422. The controller 1422 may be configured to determine which one of the first or second power sensing circuits is supplied with constant power, and based upon that determination, to respond to signals transmitted from the other of the first or second power sensing circuits that is not supplied with constant power. In accordance with such a configuration of the state change device 1400, the power supply 1440 may be appropriately coupled to both the first and second hot in terminals 1402, 1404 to draw current from the unswitched receptacle of the outlet.

It should be appreciated that one or more of the above-described components of the state change device 1400, such as the power sensing circuit 1424, the load control circuit 1426 (including one or more components of the load control circuit 1426), the memory 1428, and/or the wireless communication circuit 1436, may be at least partially integrated with (e.g., completely integrated with) the controller 1422, for example within a single microchip, such as an integrated circuit.

It should be appreciated that the example state change devices, while illustrated and described herein with reference to alternating current based load control systems, may also be configured for use with direct current based load control systems.

The invention claimed is:

1. A device configured to be electrically connected to a switched alternating current (AC) receptacle, the device comprising:
 a sensing circuit that detects whether power is present at the switched receptacle;
 a controller that is communicatively coupled to the sensing circuit and configured to generate a signal that is indicative of a change of state of power being supplied at the switched receptacle; and
 a communication circuit that is configured for wireless communication,
 wherein the controller causes the communication circuit to transmit the signal to one or more associated devices.

2. The device of claim 1, further comprising a power supply configured to supply power to the sensing circuit, the controller, and the communication circuit.

3. The device of claim 2, wherein the power supply is transitory.

4. The device of claim 2, wherein the power supply is a capacitor configured to store electricity supplied to the switched receptacle.

5. The device of claim 4, wherein the capacitor is configured to store sufficient electricity for the device to generate and transmit the signal once power is removed from the switched receptacle.

6. The device of claim 1, further comprising a memory configured to store respective last known states of the one or more associated devices.

7. The device of claim 1, wherein the one or more associated devices are load control devices.

8. The device of claim 1, further comprising a control interface.

9. The device of claim 8, further comprising a housing, wherein the control interface comprises a plurality of buttons that protrude through the housing, the buttons configured to control respective functions of the device.

10. The device of claim 9, wherein the control interface further comprises a plurality of visual indicators, each of the plurality of visual indicators corresponding to one of the plurality of buttons.

11. The device of claim 1, wherein the controller is further configured to wait for a predetermined amount of time before generating the signal.

12. A device configured to be electrically connected to a switched alternating current (AC) receptacle, the device configured for wireless communication with an associated load control device, the device comprising:
- a sensing circuit that is configured to detect an event representative of a change of state of power at the switched receptacle;
- a controller that is configured to generate a change of state signal for transmission to the load control device; and
- a transmitter that is configured to transmit the signal based on the detection of the event.

13. The device of claim 12, wherein the event is the application of power to the switched receptacle.

14. The device of claim 12, wherein the event is the removal of power from the switched receptacle.

15. The device of claim 12, wherein the sensing circuit is further configured to inform the controller of detection of the event.

16. The device of claim 15, wherein the controller causes the transmitter to transmit the signal responsive to being informed of the detection of the event by the sensing circuit.

17. The device of claim 12, further comprising a power supply configured to, after the removal of power from the switched receptacle, supply an amount of voltage to the device sufficient for the device to generate and transmit the signal.

18. The device of claim 17, wherein the power supply is a capacitor configured to store electricity when power is applied to the switched receptacle.

19. The device of claim 12, further comprising a memory communicatively coupled to the controller, wherein the controller is configured to store a last known state of the load control device in the memory.

20. The device of claim 12, wherein the controller is further configured to wait for a predetermined amount of time before generating the signal.

21. A load control system, the load control system comprising:
- a load control device configured for wireless communication, the load control device further configured to control an amount of power delivered to an electrical load electrically connected to the load control device; and
- a state change device configured for wireless communication and associated with the load control device, the state change device electrically connected to a switched receptacle of an outlet, the state change device further configured to generate a signal indicative of a change of state of power being supplied at the switched receptacle and to transmit the signal to the load control device.

22. The load control system of claim 21, wherein the state change device performs a master role within the load control system and the load control device performs a subservient role within the load control system.

23. The load control system of claim 21, wherein the load control device performs a master role within the load control system and the state change device performs a subservient role within the load control system.

24. The load control system of claim 21, wherein the state change device comprises:
- a sensing circuit that detects whether power is present at the switched receptacle;
- a controller that is communicatively coupled to the sensing circuit and configured to generate a signal indicative of a state change; and
- a communication circuit configured for wireless communication,
- wherein the controller causes the communication circuit to transmit the signal to the load control device.

25. The load control system of claim 24, wherein the state change device further comprises a power supply electrically connected to the unswitched receptacle.

26. The load control system of claim 24, wherein the controller is further configured to, upon being informed by the sensing circuit of application of power to the switched receptacle, wait a predetermined interval of time before causing the communication circuit to transmit the signal to the load control device.

27. The load control system of claim 24, wherein the controller is further configured to, upon being informed by the sensing circuit of removal of power from the switched receptacle, wait a predetermined interval of time before causing the communication circuit to transmit the signal to the load control device.

28. The load control system of claim 21, further comprising a pair of receptacles electrically connected between the unswitched hot terminal and the unswitched neutral terminal.

29. The load control system of claim 24, wherein the state change device is configured to issue commands to the load control device via radio frequency signals broadcast from the communication circuit.

30. The load control system of claim 24, wherein the state change device is configured to receive commands from the load control device via radio frequency signals received by the communication circuit.

* * * * *